(12) United States Patent
Ou et al.

(10) Patent No.: US 11,540,289 B2
(45) Date of Patent: Dec. 27, 2022

(54) METHOD AND APPARATUS FOR TIMING ADVANCE VALIDATION IN A WIRELESS COMMUNICATION SYSTEM

(71) Applicant: ASUSTek Computer Inc., Taipei (TW)

(72) Inventors: Meng-Hui Ou, Taipei (TW); Yu-Hsuan Guo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 53 days.

(21) Appl. No.: 17/036,715

(22) Filed: Sep. 29, 2020

(65) Prior Publication Data

US 2021/0112559 A1 Apr. 15, 2021

Related U.S. Application Data

(60) Provisional application No. 62/912,880, filed on Oct. 9, 2019.

(51) Int. Cl.

| H04W 72/00 | (2009.01) |
|---|---|
| H04W 72/04 | (2009.01) |
| H04W 76/30 | (2018.01) |
| H04W 76/27 | (2018.01) |
| H04W 24/10 | (2009.01) |
| H04W 56/00 | (2009.01) |

(52) U.S. Cl.
CPC ....... *H04W 72/0493* (2013.01); *H04W 24/10* (2013.01); *H04W 56/0045* (2013.01); *H04W 72/046* (2013.01); *H04W 72/0413* (2013.01); *H04W 72/0446* (2013.01); *H04W 76/27* (2018.02); *H04W 76/30* (2018.02)

(58) Field of Classification Search
None
See application file for complete search history.

(56) References Cited

FOREIGN PATENT DOCUMENTS

| EP | 3346776 | 7/2018 |
|---|---|---|
| WO | 2020/188144 | 9/2020 |

OTHER PUBLICATIONS

Sierra Wireless, "LTE-M PUR RSRP TA Validation Design Considerations", R4-1902961, 3GPP TSG-RAN WG4, Meeting #90bis, Xi'an, China, Apr. 8-12, 2019.
Qualcomm Incorporated, "On TA Validation for NB-IoT PUR", R4-1903290, 3GPP TSG-RAN WG4, Meeting #90-Bis, Xi'an, China, Apr. 8-12, 2019.
Notice of Submission of Opinion in corresponding KR Application No. 10-2020-0127226, dated Dec. 15, 2021.
(Continued)

*Primary Examiner* — Willie J Daniel, Jr.
(74) *Attorney, Agent, or Firm* — Skaar Ulbrich Macari, P.A.

(57) ABSTRACT

A method and device are disclosed from the perspective of a UE (User Equipment). In one embodiment, the method includes the UE receiving a first signaling to configure a preconfigured uplink resource (PUR) to be used in a cell. The method further includes the UE determining whether to use the PUR in the cell at least based on whether a timing advance is valid, wherein whether the timing advance is valid is based on a difference between a first measurement result and a second measurement result, and wherein the first measurement result is not a cell measurement quantity of the cell.

20 Claims, 11 Drawing Sheets

(56) References Cited

OTHER PUBLICATIONS

Sierra Wireless, "NB-IOT Pre-configured UL Resources Design Considerations", Discussion and Decision, R1-1910525, Agenda Item: 6.2.2.2 Support for Transmission in preconfigured UL resources; 3GPP TSG RAN WG1 #98bis, Chongqing, China, Oct. 14-20, 2019.
European Search Report in corresponding EP Application No. 20198879.7, dated Feb. 16, 2021.
Sierra Wireless, "NB-IOT Pre-configured UL Resources Design Considerations", 3GPP Draft; R1-1910525, NB-IOT PUR, 3rd Generation Partnership Project (3GPP), Mobile Competence Centre; 650, Route Des Lucioles; F-06921 Sophia-Antipolis Cedex; France, vol. Ran WG1, No. Chongquing, China; Oct. 14, 2019-Oct. 20, 2019, Oct. 4, 2019, XP051808229.
RAN WG4, "LS on signalling measurement thresholds for validating the TA for PUR", 3GPP Draft; R4-1910176, 3rd Generation Partnership Project (3GPP), Mobile Competence Centre; 650, Route Des Lucioles; F-06921 Sophia-Antipolis Cedex; France, vol. RAN WG4, No. Ljubljana, Slovenia; Aug. 26, 2019-Aug. 30, 2019, Sep. 2, 2019 (Sep. 2, 2019), XP051772995.

METHOD AND APPARATUS FOR TIMING ADVANCE VALIDATION IN A WIRELESS COMMUNICATION SYSTEM

CROSS-REFERENCE TO RELATED APPLICATIONS

The present Application claims the benefit of U.S. Provisional Patent Application Ser. No. 62/912,880 filed on Oct. 9, 2019, the entire disclosure of which is incorporated herein in their entirety by reference.

FIELD

This disclosure generally relates to wireless communication networks, and more particularly, to a method and apparatus for timing advance validation in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed from the perspective of a UE (User Equipment). In one embodiment, the method includes the UE receiving a first signaling to configure a preconfigured uplink resource (PUR) to be used in a cell. The method further includes the UE determining whether to use the PUR in the cell at least based on whether a timing advance is valid, wherein whether the timing advance is valid is based on a difference between a first measurement result and a second measurement result, and wherein the first measurement result is not a cell measurement quantity of the cell.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 38.304 V15.5.0, "NR, User Equipment (UE) procedures in Idle mode and RRC Inactive state"; R4-1910176, "LS on signalling measurement thresholds for validating the TA for PUR"; RP-192160, "Summary of email discussion on NR-Light", Ericsson; R2-1912001, "Report of 3GPP TSG RAN2 #107 meeting, Prague, Czech Republic"; R4-1910701, "RAN4 #92 Meeting report" (available at https://www.3gpp.org/ftp/tsg_ran/WG4_Radio/TSGR4_92/Report/); 3GPP TSG RAN2 #107 Chairman's Notes; 3GPP TSG RAN1 #96 Chairman's Notes; 3GPP TSG RAN1 #96bis Chairman's Notes; 3GPP TSG RAN1 #97 Chairman's Notes; Wikipedia article entitled "Timing advance" (available at https://en.wikipedia.org/wiki/Timing_advance); TS 38.300 V15.6.0, "NR, NR and NG-RAN overall description, Stage 2"; TS 38.331 V15.6.0, "NR, Radio Resource Control (RRC) protocol specification"; and TS 38.321 V15.6.0, "NR, Medium Access Control (MAC) protocol specification". The standards and documents listed above are hereby expressly incorporated by reference in their entirety.

Figure 1:
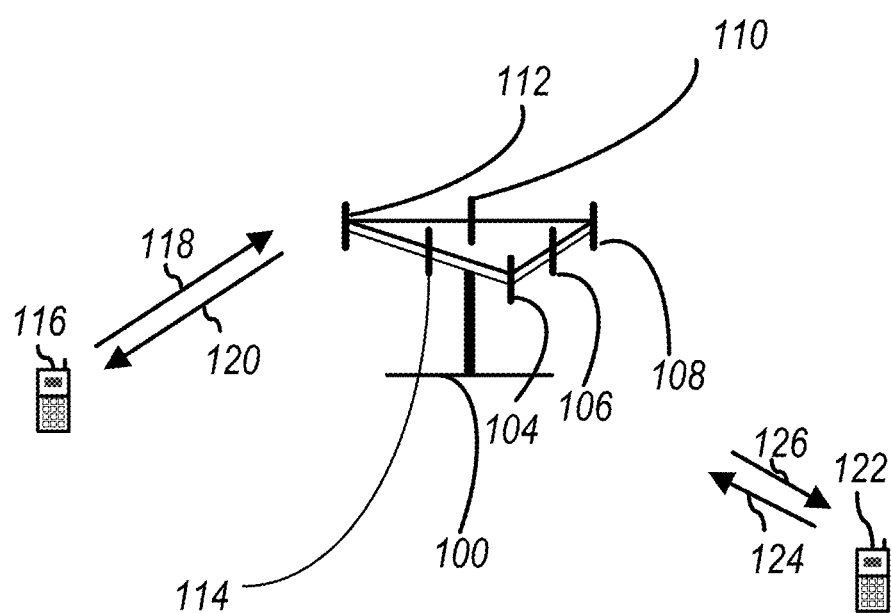
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
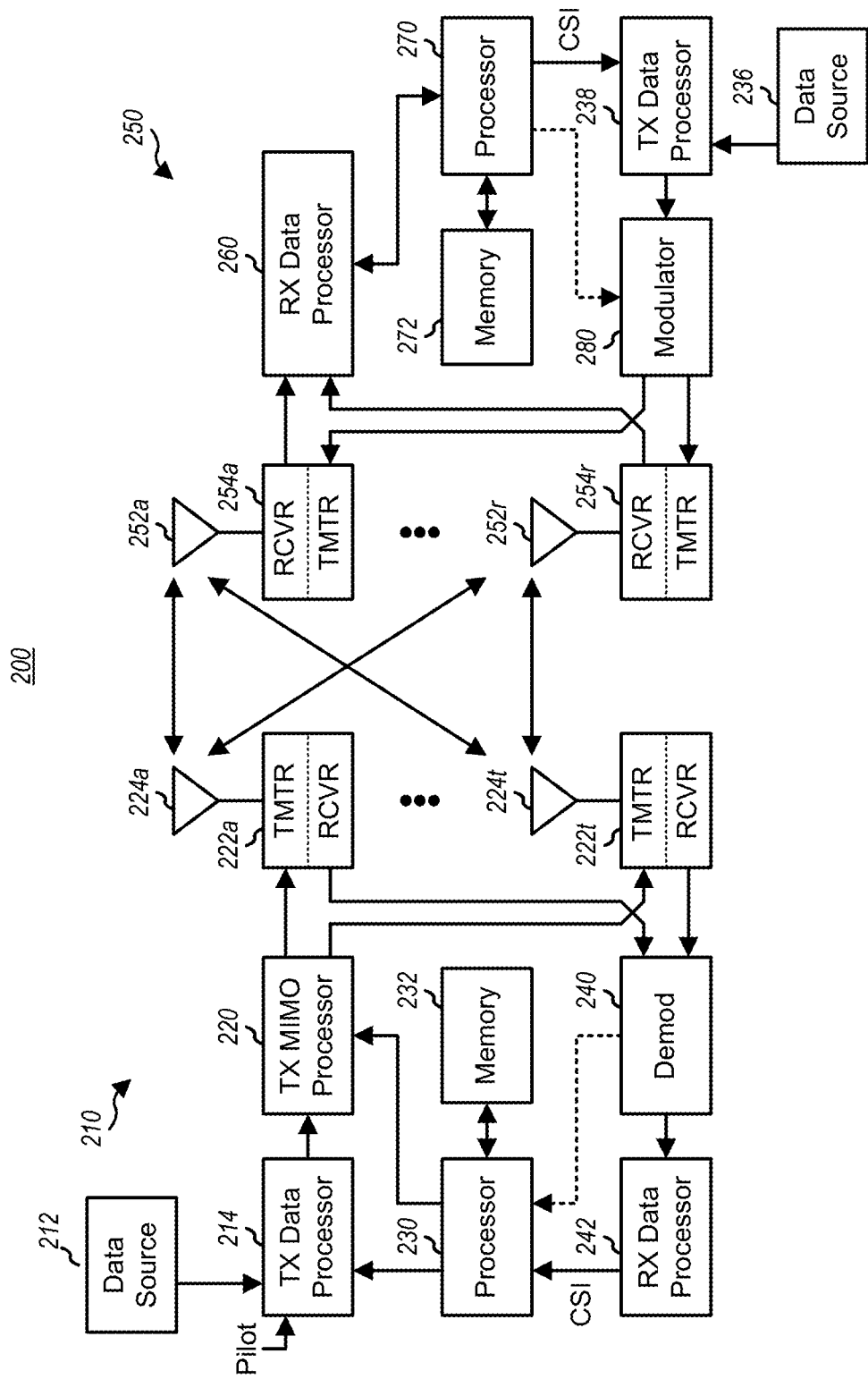
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
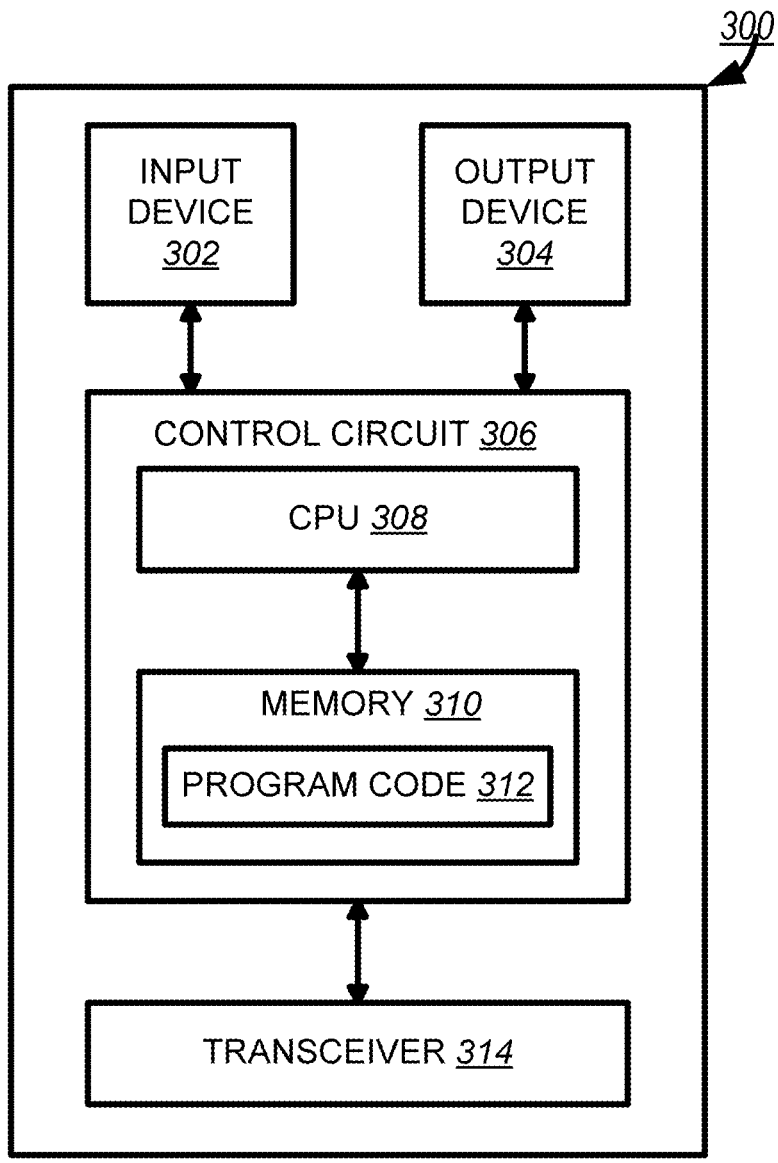
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
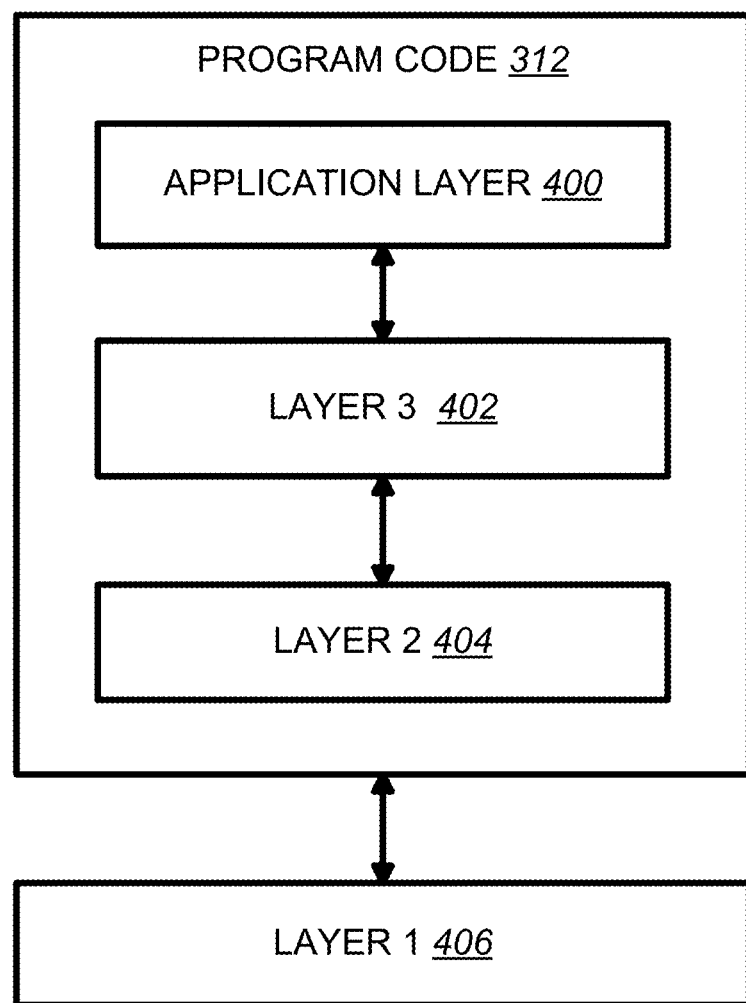
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

In NR, measurement quantity for cell reselection is specified in 3GPP TS 38.304 as follows:
For cell selection in multi-beam operations, measurement quantity of a cell is up to UE implementation.
For cell reselection in multi-beam operations, including inter-RAT reselection from E-UTRA to NR, the measurement quantity of this cell is derived amongst the beams corresponding to the same cell based on SS/PBCH block as follows:
   if nrofSS-BlocksToAverage (maxRS-IndexCellQual in E-UTRA) is not configured in SIB2/SIB4 (SIB24 in E-UTRA); or
   if absThreshSS-BlocksConsolidation (threshRS-Index in E-UTRA) is not configured in SIB2/SIB4 (SIB24 in E-UTRA); or
   if the highest beam measurement quantity value is below or equal to absThreshSS-BlocksConsolidation (threshRS-Index in E-UTRA):
     derive a cell measurement quantity as the highest beam measurement quantity value, where each beam measurement quantity is described in TS 38.215 [11].
   else:
     derive a cell measurement quantity as the linear average of the power values of up to nrofSS-BlocksToAverage (maxRS-IndexCellQual in E-UTRA) of highest beam measurement quantity values above absThreshSS-BlocksConsolidation (threshRS-Index in E-UTRA).

In 3GPP R4-1910176, TA validation for PUR in LTE is specified as follows:
RAN4 would like to inform RAN2 that RAN4 has discussed and agreed to use K number of measurement thresholds for validating the TA when UE is configured to validate the TA using serving cell measurement change method. The measurement is RSRP for cat-M and NRSRP for NB-IoT. The value of K is 1 or 2.
If K=1 means UE compares the magnitude of the difference in measurement change with a single threshold to validate the TA for PUR transmission.
If K=2 means UE compares the difference in measurement change with a negative ($RSRP_{neg}$/$NRSRP_{neg}$) threshold and also compares the difference in measurement change with a positive ($RSRP_{pos}$/$NRSRP_{pos}$) threshold. The UE validates the TA for PUR transmission based on these comparisons.
UE needs to be configured about the number of the measurement threshold(s) as well as the thresholds for validating the TA for PUR transmission.
The range of the measurement threshold(s) are specified as follows:
   between N dB to M dB with TBD resolution when two thresholds (K=2) are used excluding 0 dB value where N<0, and M>0.
   between H dB to L dB with TBD resolution when single threshold (K=1) is used excluding 0 dB value where H>0, and L>0 and L>H.
In addition, a tentative agreement was made in the RAN4 #92 meeting (as captured in 3GPP R4-1910701) as follows:
Tentative Agreement:
   Both in serving cell relaxed monitoring mode and in sering cell non-relaxed monitoring mode, if UE is configured with RSRP change for TA validation, it shall satisfy the following conditions
   The first measurement (RSRP1) shall be performed within following time range:

$$T1-N \leq T1' \leq T1+N;$$

The second measurement (RSRP2) shall be performed within following time range:

$$T2-M \leq T2' < T2;$$

Where T1' is the time when RSRP1 becomes available, T1 is the time when TA is obtained, N is TBD, T2' is the time when RSRP2 becomes available, T2 is the time when TA is validated, M TBD.
Relaxation on serving cell monitoring is allowed regardless of TA validation mechanism.

In the RAN2 #107 meeting, PUR (Preconfigured Uplink Resource) was discussed and the following agreement was reached (as captured in the 3GPP TSG RAN2 #107 Chairman's Notes) as follows:
Agreements
   Valid TA is a requirement in order to initiate D-PUR transmission.
   The UE may use the D-PUR resource to send RRCConnectionRequest or RRCConnectionResumeRequest to establish or resume RRC connection.
     FFS: whether the UE can send part of the data using the padding in this case
     FFS: whether the UE can segment and send part of the data using the D-PUR resource
   For the CP solution, the uplink data are encapsulated as a NAS PDU in an uplink RRC message transmitted in CCCH.
   For the UP solution, the uplink data are transmitted in DTCH.
   After the uplink D-PUR transmission, the UE monitors PDCCH under the control of a timer:
     The timer starts after D-PUR transmission.
     The timer restarts if a scheduling for D-PUR retransmission is received.
     The UE considers that the D-PUR transmission has failed if the timer expires.
     The timer is stopped when D-PUR procedure ends/succeeds.
   The downlink RRC response message, if needed, for the CP solution may include the following optional information:
     downlink data encapsulated as a NAS PDU (downlink application layer response or pending data in MME)
     redirection information
     D-PUR (re-)configuration and release
     FFS extendedWaitTime
   The downlink RRC response message for the UP solution may include the following optional information:
     Resume ID
     NCC (mandatory)—the downlink RRC response message for the UP solution is always provided.
     redirection information
     D-PUR (re-)configuration and release
     FFS extendedWaitTime
   The MAC CE for TA update can be sent along with the RRC transmission of the downlink RRC response message for the CP solution and UP solution.
     FFS for CP solution if MAC CE for TA update can be sent without a downlink RRC response message.

After reception of D-PUR transmission, the eNB can move the UE to RRC connection by RRCConnectionSetup message or RRCConnectionResume message.

Fallback after D-PUR transmission is not successful is not specified i.e. it is up to UE implementation to initiate legacy RA, MO-EDT or wait for next D-PUR occasion. FFS how to handle the skip in case of failure (UL or DL)

[ . . . ]

Agreements:

TA validation criterion "Serving cell changes" is implicitly always enabled, which means that TA is considered invalid when the UE initiates RA procedure in a different cell than where TA was last validated.

Configuration for TA validation criteria is provided in dedicated RRC signaling.

It should be possible to disable each or all of the optional TA validation criteria (i.e., TA timer, (N)RSRP change) via RRC signaling.

UE keeps the PUR configuration while TA is considered invalid, but PUR cannot be used until eNB validates the existing TA/provides a new TA.

Working assumption: Counter for D-PUR occasions, i.e., "n", is not introduced and "indefinite" or "one-shot" are the only possible configurations.

Anew TA timer is defined for UEs configured with D-PUR in idle mode.

The (re)starting times for TA timer need to be aligned between UE and eNB. The details of the mechanism are FFS.

TA timer is restarted after TA is updated.

The value range for the TA timer is FFS. Value of "infinity" is possible.

Agreements:

D-PUR request can be sent only by BL UE, UE in CE or NB-IoT UE; and which are capable of D-PUR.

D-PUR request can be sent when the UE is in RRC_CONNECTED.

D-PUR request includes number of PUR grant occasions requested with possibility to request infinite. FFS other values.

UE can request D-PUR release. FFS how.

A new RRC message is introduced for transmission of PUR request when UE is in RRC_CONNECTED (i.e., not for the cases of sending PUR request during EDT and during PUR).

UE-specific PUR (re)configuration can be provided while UE is in RRC_CONNECTED.

PUR (re)configuration can be included in RRC Connection Release.

At least the following information can be included in PUR (re)configurations:

"m" consecutive missed allocations before release, FFS values;

Time Alignment Timer for idle mode;

RSRP change threshold for Serving cell

[ . . . ]

Agreements

For UP solution, when PUR request is being piggybacked in the PUR transmission, same RRC message used for PUR transmission is used to include PUR request.

PUR (re)configuration can be provided in DL RRC response message (message FFS) of the D-PUR procedure.

Explicit reject message (NW→UE) in response to PUR request is not introduced

Delta configuration is supported for PUR reconfiguration.

If the UE performs EDT or moves to RRC_CONNECTED and comes back to RRC_IDLE in the same cell, PUR configuration remains valid unless specifically released or reconfigured by network or other triggers.

PUR can be released explicitly by RRCConnectionRelease message and DL RRC response message (FFS message) of the D-PUR procedure.

FFS: RRCEarlyDataComplete

FFS: When UE initiates RACH/EDT, whether it has D-PUR configuration(s) is not explicitly notified to the network.

EDT cannot be initiated solely for the purpose of sending PUR request in EDT Msg3.

UE is not restricted from initiating RRC Connection for the purpose of sending PUR request (i.e. this agreement has no impact to legacy RRC Connection Establishment/Resume procedures).

[ . . . ]

RAN2 Confirm the Intention of the Previous Agreement as Follows:

If RRC response message is not needed, eNB may send L1 ACK to acknowledge the PUR transmission in UL. The L1 ACK concludes the PUR procedure and UE moves to Idle.

Some texts related to RAN1 agreements for Preconfigured Uplink Resources (PUR) in LTE are provided in the 3GPP TSG RAN1 #96 Chairman's Notes, the 3GPP TSG RAN1 #96bis Chairman's Notes, and the 3GPP TSG RAN1 #97 Chairman's Notes. The 3GPP TSG RAN1 #96 Chairman's Notes state:

Additional MTC Enhancements

Agreement

In idle mode, the TA validation configuration can include "PUR Time Alignment Timer"

Where the UE considers the TA as invalid if the (current time−time at last TA update)>the PUR Time Alignment Timer Details on how to specify the "PUR Time Alignment Timer" is up to RAN2

Agreement

In idle mode, when the UE validates TA, the UE considers the TA for the previous serving cell as invalid if the serving cell changes Above applies for the case where the UE is configured to use the serving cell change attribute Agreement For dedicated PUR in idle mode, the Dedicated PUR ACK is at least sent on MPDCCH RAN2 can decide if a higher layer PUR ACK is also supported Agreement For dedicated PUR in idle mode, the PUR search space configuration shall be included in the PUR configuration.

PUR search space is the search space where UE monitors for MPDCCH

FFS: Whether PUR search space is common or UE specific

Agreement

When the TA is validated and found to be invalid and the UE has data to send, the UE can obtain a valid TA and may send data via legacy RACH or EDT procedures FFS whether only TA is acquired and then data sent on PUR is supported FFS other approaches to obtain a valid TA Agreement
When the UE is configured to use several TA validation criteria, the TA is valid only when all the configured TA validation criteria are satisfied.

Agreement
For dedicated PUR, in idle mode, the PUR resource configuration includes at least the following
   Time domain resources including periodicity(s)
      Note: also includes number of repetitions, number of RUs, starting position
   Frequency domain resources
   TBS(s)/MCS(s)
   Power control parameters
   Legacy DMRS pattern Agreement
In idle mode, at least the following PUR configurations and PUR parameters may be updated after a PUR transmission:
   Timing advance adjustment
   UE TX power adjustment
   FFS: Repetition adjustment for PUSCH
FFS: Whether the above update is done in L1 and/or higher layer Agreement
In idle mode, the PUR search space configuration includes at least the following:
   MPDCCH narrowband location
   MPDCCH repetitions and aggregation levels
   MPDCCH starting subframe periodicity (variable G)
   Starting subframe position (alpha_offset)

Agreement
For dedicated PUR in idle mode, the PUR resource configuration includes at least the following
   A PUSCH frequency hopping indication to enable or disable legacy frequency hopping Agreement
In idle mode, a UE can be configured such that TA is always valid within a given cell.
   FFS: up to RAN2 how to implement e.g. PUR Time Alignment Timer=infinity Additional Enhancements for NB-IoT Agreement
When the UE is configured to use several TA validation criteria, the TA is valid only when all the configured TA validation criteria are satisfied.

Agreement
For dedicated PUR in idle mode, the PUR search space configuration shall be included in the PUR configuration.
   PUR search space is the search space where UE monitors for NPDCCH
   FFS: Whether PUR search space is common or UE specific Agreement
In idle mode, the TA validation configuration can include "PUR Time Alignment Timer"
   Where the UE considers the TA as invalid if the (current time−time at last TA update)>the PUR Time Alignment Timer
   Details on how to specify the "PUR Time Alignment Timer" is up to RAN2

Agreement
In idle mode, when the UE validates TA, the UE considers the TA for the previous serving cell as invalid if the serving cell changes
   Above applies for the case where the UE is configured to use the serving cell change attribute Agreement
For dedicated PUR in idle mode, the dedicated PUR ACK is at least sent on NPDCCH
   FFS: Whether to introduce new field in DCI or reuse existing field
   RAN2 can decide if a higher layer PUR ACK is also supported Agreement
When the TA is validated and found to be invalid and the UE has data to send, the UE can obtain a valid TA and may send data via legacy RACH or EDT procedures
   FFS whether only TA is acquired and then data sent on PUR is supported
   FFS other approaches to obtain a valid TA Agreement
In idle mode, at least the following PUR configurations and PUR parameters may be updated after a PUR transmission:
   Timing advance adjustment
   UE TX power adjustment
   FFS: Repetition adjustment for NPUSCH
FFS: Whether the above update is done in L1 and/or higher layer Agreement
In idle mode, the PUR search space configuration includes at least the following:
   NPDCCH repetitions and aggregation levels
   NPDCCH starting subframe periodicity (variable G)
   Starting subframe position (alpha_offset)

Agreement
For dedicated PUR, in idle mode, the PUR resource configuration includes at least the following
   Time domain resources including periodicity(s)
      Note: also includes number of repetitions, number of RUs, starting position
   Frequency domain resources
   TBS(s)/MCS(s)
   Power control parameters
   Legacy DMRS pattern
   The 3GPP TSG RAN1 #96bis Chairman's Notes state:
Additional MTC Enhancements
Working Assumption #1
In idle mode, updating PUR configurations and/or PUR parameters via L1 signalling after a PUR transmission is supported
   FFS: Which PUR configurations and PUR parameters will be signaled via L1
   FFS: Definition of PUR configurations and PUR parameters
The working assumption will be automatically confirmed if for some cases L2/L3 signaling is not needed. If RAN2 decides that L2/L3 signaling is needed for all cases, the working assumption will be reverted.
Working Assumption #2
For dedicated PUR
   During the PUR search space monitoring, the UE monitors for DCI scrambled with a RNTI assuming that the RNTI is not shared with any other UE
      Note: It is up to RAN2 to decide how the RNTI is signaled to UE or derived
   FFS if the UE monitors any additional RNTI which may be shared with other UEs.
   Note: The same RNTI may be used over non-overlapping time and/or frequency resources
Send an LS to RAN2 to include two above working assumptions. Ask whether the first bullet in working assumption #2 is feasible. If it is concluded that working assumption #2 is feasible, the working assumption #2 will be automatically confirmed.
Agreement
The UE monitors the MPDCCH for at least a time period after a PUR transmission
  FFS: Details of the time period
  FFS: UE behaviour if nothing is received in the time period
  FFS: If and how often UE monitors MPDCCH after a PUR allocation in which it has not transmitted
Agreement
The value(s) of RSRP threshold(s) is UE specific
Agreement
The power control parameters within the PUR configuration, shall at least include:
  Target UL power level (P_0) for the PUR transmission
Agreement
For dedicated PUR in idle mode, the PUR configuration is configured by UE-specific RRC signaling.
Additional Enhancements for NB-IoT
Agreement
In idle mode, a UE can be configured such that TA is always valid within a given cell.
  Up to RAN2 how to implement
    e.g. PUR Time Alignment Timer or NRSRP Threshold=infinity
Agreement
The value(s) of NRSRP threshold(s) is UE specific
Agreement
The UE monitors the NPDCCH for at least a time period after a PUR transmission.
  FFS: Details of the time period
  FFS: UE behaviour if nothing is received in that time period.
  FFS: If and how often UE monitors NPDCCH after a PUR allocation in which it has not transmitted
Agreement
Reuse existing field(s) of DCI format NO to convey the dedicated PUR ACK
Agreement
After data transmission on PUR, upon unsuccessful decoding by eNB, the UE can expect an UL grant for retransmission on NPDCCH. Other behaviors are FFS.
Working Assumption #1
In idle mode, updating PUR configurations and/or PUR parameters via L1 signalling after a PUR transmission is supported
  FFS: Which PUR configurations and PUR parameters will be signaled via L1
  FFS: Definition of PUR configurations and PUR parameters
The working assumption will be automatically confirmed if for some cases L2/L3 signaling is not needed. If RAN2 decides that L2/L3 signaling is needed for all cases, the working assumption will be reverted.
Working Assumption #2 For dedicated PUR
  During the PUR search space monitoring, the UE monitors for DCI scrambled with a RNTI assuming that the RNTI is not shared with any other UE
    Note: It is up to RAN2 to decide how the RNTI is signaled to UE or derived
  FFS if the UE monitors any additional RNTI which may be shared with other UEs.
    Note: The same RNTI may be used over non-overlapping time and/or frequency resources
Send an LS to RAN2 to include two above working assumptions. Ask whether the first bullet in working assumption #2 is feasible. If it is concluded that working assumption #2 is feasible, the working assumption #2 will be automatically confirmed. (LS is approved in eMTC agenda item—see 6.2.1.2)
Agreement
For dedicated PUR in idle mode, the PUR configuration is configured by UE-specific RRC signaling.
  The 3GPP TSG RAN1 #97 Chairman's Notes state:
Additional MTC Enhancements
Agreement
For a given UE, for dedicated PUR in idle mode and for a given CE mode, the same size DCI, the same PUR M-PDCCH candidates, and the same RNTI is used for all DCI messages for unicast transmissions.
Agreement
For dedicated PUR in idle mode and for HD-FDD UEs, the start of the PUR SS Window is [x] subframes after the end PUR transmission
  FFS: Value of x, and if x is fixed or signaled
  FFS: FD-FDD UEs, TDD UEs
  FFS: Support for monitoring of PUR SS Window before PUR transmission
  Note: The PUR SS Window is the time period where the UE monitors the MPDCCH for at least a time period after a PUR transmission
Agreement
For dedicated PUR in idle mode,
The maximum mPDDCH repetitions, $r_{max}$-mPDCCH-PUR, is included in the PUR configuration
Agreement
For dedicated PUR in idle mode, the duration of the PUR SS window is configured by eNB How the duration is configured, and the possible values, will be decided by RAN2.
Agreement
For dedicated PUR in idle mode, the CE mode is
Option 1: explicitly configured in the PUR configuration.
Option 2: based on CE mode of last connection
Down select in RAN1 #98
Agreement
Select one of the following in RAN1 #98
  Alt1: In idle mode, the PUR search space PRB pairs is configured between {2, 2+4, 4}PRBs
  Alt2: In idle mode, the PUR search space PRB pairs is fixed to 2+4 PRBs
Agreement
For dedicated PUR in idle mode, if a UE skips a PUR transmission, it is not mandated to monitor the associated PUR SS window
Additional Enhancements for NB-IoT
Agreement
For dedicated PUR in idle mode and for HD-FDD UEs, the start of the PUR SS Window is [x] subframes after the end PUR transmission
  FFS: Value of x, and if x is fixed or signaled
  FFS: Support for monitoring of PUR SS Window before PUR transmission
  Note: The PUR SS Window is the time period where the UE monitors the NPDCCH for at least a time period after a PUR transmission
Agreement
NPDCCH candidates are determined by USS like search space
  FFS: Other details on the USS like search space
    Type2-CSS can also be discussed as part of the FFS Conclusion CBS PUR is not supported in Rel-16

For Further Discussion

Aspects related to notifying eNB of unused PUR resources.

Potential enhancements of power control mechanisms for PUR. (The baseline is the existing NB-IoT open loop power control.)

In 3GPP RP-192160, the preliminary discussion result of NR light in 3GPP RAN working group is captured as follows:

3.1 Summary of Use Cases

Companies highlighted three main use cases for NR Light devices:

Industrial Wireless Sensors (26 companies out of 34)
Video surveillance (22 companies out of 34)
Wearables (22 companies out of 34)

It is suggested to focus on these 3 use cases in the potential Rel-17 study/work item.

Industrial Wireless Sensor Networks: Devices in such network include e.g. pressure sensors, humidity sensors, thermometers, motion sensors, accelerometers, etc. As compared to URLLC, this use case is more relaxed in terms of latency and reliability. On the other hand, the device cost and power consumption should be lower than in URLLC and eMBB. Use cases are described e.g. in TS 22.104, TR 22.832 and TS 22.804.

Surveillance camera use case covers video surveillance for smart city, factories industries etc. As example, TS 22.804 describes smart city use case and requirements for that. The smart city vertical covers data collection and processing to more efficiently monitor and control city resources, and to provide services to city residents.

Wearables use case includes smart watches, rings, eHealth related devices and some medical monitoring devices etc. One characteristic for the use case is that the device is small in size.

In addition, low end smartphones were mentioned by 6 companies. It is proposed to discuss this use case later on once Rel-16 email discussion on this topic is concluded. With respect to other use cases beyond that, it is proposed that those are not discussed explicitly. However, it should be noted that any solution and a device type that is introduced should be generic so that it can be applied in many use cases. By this way, market fragmentation can be avoided.

Deployment scenarios: Most companies mention indoor and outdoor deployments and FDD/TDD. Around 8 companies explicitly stated that both FR1 and FR2 should be included whereas 3 companies want to prioritizes only FR1. Thus it is suggested that both FR1 and FR2 are included in the scope.

3.2 Summary of Key Requirements

The key requirements are divided in the generic and use case specific requirements:

Generic Requirements:

Device Cost: As Mentioned by Companies, One Main Motivation of this Study Item is to Lower the UE device cost and complexity as compared to high-end eMBB device of Rel-15/Rel-16. This is especially the case for the for industrial sensors. It is assumed that the cost is reduced by reducing the supported bandwidth as well as RX antennas. However, it is understood the system should be backwards compatible and that Rel-15 NR SS/PBCH blocks should be reused.

Device size: One requirement is that the standard enables a device design with smaller size.

Coverage: It is common understanding that coverage of the cell would be similar to Rel-15/16 deployment except that there is need to compensate for the coverage loss due to reduced number of Rx antennas, reduced UE bandwidth, transmit power level, and other UE complexity reductions.

Use Case Specific Requirements:

Industrial wireless sensors: Some reference use cases and requirements are described in TR 22.832 and TS 22.104: Communication service availability is 99.99% and end-to-end latency less than 100 ms. The bit rate requirement is less than 2 Mbps for all use cases and the device is stationary. The battery should last at least few years. For safety related sensors, latency requirement is lower, 5-10 ms (TR 22.804)

Video Survaillance: As described in TS 22.804, economic video bitrate would be 2-4 Mbps, latency <500 ms, reliability 99.0-99.9%. High end video e.g. for farming would require 7.5-25 Mbps. It is noted that traffic is heavy in UL.

Wearables: Many companies mentioned LTE Cat 4 as a reference for the bitrate, corresponding to 150 Mbps50 Mbps. However, some companies considered that also lower bitrates (<20 Mbps) can be utilized, and even 1 Mbps (Sony). Battery of the device should last multiple days (up to 1 week).

3.3 Summary of Evolution Areas

Companies highlighted four main evolution areas:

1. UE complexity reduction or lower UE power class (31 out of 32 companies),
2. UE power saving and battery lifetime enhancement (29 out of 32 companies),
3. System aspects (28 out of 32 companies), and
4. Support high UE density (6 out of 32 companies).

Thus, it is suggested to focus on these 4 evolution areas in the potential Rel-17 study/work item.

UE complexity reduction or lower UE power class: the features mentioned by most companies are Reduce number of UE antennas (26 companies): A majority of companies suggested 1 or 2 RX antennas and 1 TX antenna UE Bandwidth reduction (27 companies): No company suggests to have maximum UE bandwidth higher than 20 MHz in FR1. Some companies further suggested UE bandwidth to be limited to 5 or 10 MHz. For FR2, one company suggested UE bandwidth to be no higher than 40 MHz.

Lower UE power class (13 companies): Proposed power levels range from 4 to 20 dBm.

Half-Duplex-FDD (9 companies)

Relaxed UE processing time or capability (8 companies)

UE power saving and battery lifetime enhancement: the features mentioned by most companies are Reduced PDCCH monitoring (17 companies): The enhancements mentioned include fewer CORESET and search spaces configurations, and small numbers of blind decodes and CCE limits.

UE power saving in RRC Idle/Inactive (16 companies): Most companies did not include specific feature proposals, but a few companies suggested WUS, RRM relaxation Enhanced DRX for RRC Inactive or Idle (7 companies)

Optimization for stationary devices with limited mobility (7 companies)

It is noted that power saving is discussed also in another email discussion. With respect to NR Light, the focus should be in less frequent data transmission and power consumption in IDLE/INACTIVE mode.

System aspects mentioned by most companies:
  Coverage recovery is needed to compensate the device complexity reduction, especially reduced amount of RX antennas (mentioned by 23 companies)
  SSB should be reused and L1 changes minimized (9 companies)
  Backward compatibility and coexistence with wideband UE should be ensured (8 companies)
  UE relay or sidelink was mentioned (9 companies): However, these topics are addressed the sidelink enhancements email discussion.
Support High UE Density
6 companies suggested to work on this evolution area. However, no single feature is mentioned by more than 3 companies. The exact candidate features can be discussed further.
3.4 Summary of 'Other Comments'
Here are some issues companies brought up. These can be discussed further.
  One company mentions that the features potentially introduced in this SI/WI should be generic and available to any NR UE.
  Two companies mention that 'NR-Light' may not be a suitable name and that 'NR-Lightweigth' or 'Enhanced support for lower-complexity NR UEs' may be more suitable.
  Two companies comment that the Rel-17 features Small Data Enhancements, Power Savings in Connected Mode, and Relaying should generally be applicable to NR-Light UEs. There is need to coordinate the study/work item scope and avoid overlap.
  One company thinks the number of new UE categories/types introduces for NR-Light should be minized to avoid market fragmentation.

In general, Internet of Things (IoT) has been a very important area to be developed in 5G. In 3GPP, study and specifications on features to support IoT devices are taking place continuously. For example, NR_Light (namely NR_Lite, NR-IoT, NR-Light) is likely to be introduced, e.g. in NR Release 17. The target of NR_Light is mid-end/high-end IoT devices (e.g. industrial sensors, surveillance cameras). Compared to NR eMBB (or NR URLLC) device, characteristics of NR light devices may include lower device complexity, lower cost, lower data rate and higher latency, longer battery life. More details about NR_Light including use cases, key requirements, and evolution area, has been specified in 3GPP RP-192160 as discussed above.

At least one new NR UE capability may be defined for NR_Light UEs. It is assumed that an NR_Light UE connects to gNB rather than eNB. It is also assumed that the NR_Light UE supports at least some of the NR techniques, which may include, for example, Bandwidth part (BWP) operation, beam operation.

To support NR_Light devices (or NR_Light UEs) in NR, some mechanisms to improve transmission efficiency and reduce power consumption may be introduced in NR. For example, NR may introduce a mechanism similar to Pre-configured Uplink Resources (PUR) in LTE MTC or NB-IoT. For example, while the UE is in e.g. RRC_IDLE state or RRC_INACTIVE state, when there is UL data available for transmission, the UE could transmit the UL data using PUR instead of initiating a RA procedure. The UE could monitor Physical Downlink Control Channel (PDCCH) for receiving Network (NW) response (for PUR) after transmitting the UL data using PUR. The NW response could be an Acknowledgement (ACK) or Negative Acknowledgement (NACK) indication. The NW response could be a Uplink (UL) grant scheduling retransmission of the UL data. The NW response could be a Downlink (DL) assignment scheduling DL data and the UE receives the corresponding DL data according to the DL assignment. After receiving the NW response (for PUR), the UE may stay in RRC_IDLE or RRC_INACTIVE state. After receiving the NW response (for PUR), the UE may enter RRC_CONNECTED state (e.g. in case the DL data includes RRCSetup or RRCResume message).

Before the UE performs a UL transmission, the UE may determine whether or not the UL data could be transmitted using PUR, based on some conditions. The UL data may include an RRC message (e.g. RRCSetupRequest, RRCResumeRequest, RRCEarlyDataRequest). The UL data may include data coming from application layer. The UE may not initiate a RA procedure if the UE determines that the UL data could be transmitted using PUR. The UE may initiate a RA procedure if the UE determines that the UL data could not be transmitted using PUR. The UE may initiate an RRC connection establishment procedure and transmits the RRC message (e.g. RRCSetupRequest) during a RA procedure if the UE determines that the UL data could not be transmitted using PUR. The UE may initiate an RRC connection resume procedure and transmits the RRC message (e.g. RRCResumeRequest) during a RA procedure if the UE determines that the UL data could not be transmitted using PUR. The UE may initiate an RRC connection establishment procedure and transmits the RRC message (e.g. RRCSetupRequest) using PUR if at least the RRC message could be transmitted using PUR. The UE may initiate an RRC connection resume procedure and transmits the RRC message (e.g. RRCResumeRequest) using PUR if at least the RRC message could be transmitted using PUR.

The conditions may include whether the (potential) data size of the UL data is not larger than a threshold (and the threshold may be predefined or configured in the PUR configuration). The conditions may include whether the service type of the UL data is a specific service type (e.g. data from a configured logical channel). The conditions may include whether the establishment cause is a specific establishment cause (e.g. mo-Data). The conditions may include whether the Serving Cell (on which the UE camps) supports PUR (e.g. indicated in the system information). The conditions may include whether the UE has a PUR configuration. The PUR configuration may include time or frequency resource information for PUR. The PUR configuration may include beam information for PUR, e.g. which beam(s) of the cell is configured with PUR. The PUR configuration may include parameters related to Timing Advance (TA) validation for PUR. The PUR configuration may include parameters related to PDCCH monitoring for PUR. The UE may receive the PUR configuration from the NW while the UE is in RRC_CONNECTED state. The UE may receive the PUR configuration from the NW in the DL data after performing the UL transmission using PUR.

The conditions may include whether or not TA is valid for PUR. The UE determines whether or not TA is valid for PUR according to the PUR configuration. The UE may consider the TA for PUR to be valid if (at least) a TA timer (for PUR) is running. The UE may consider the TA for PUR to be valid if (at least) the measured Radio Signal Received Power (RSRP) of the Serving Cell is above (or not below) a threshold (and the threshold could be predefined or configured in the PUR configuration). The conditions may include whether or not the next occurred PUR occasion is not too far away in time domain (e.g. the UE may determine whether or not the UL data could be transmitted using PUR if the time duration from the determination to the next occurred PUR occasion is smaller (or not larger) than a threshold, and the threshold may be predefined or configured in the PUR configuration). The conditions may include whether or not the time duration between current available PUR occasion and next available PUR occasion is smaller (or not larger) than a threshold (and the threshold may be included in the PUR configuration). The UE determines the next occurred PUR occasion according to the PUR configuration. The UE performs transmission using PUR on the PUR occasion.

If the UE determines that the UL data could be transmitted using PUR based on at least one of the above listed conditions, the UE may consider that there is available PUR or the PUR is available. If the UE determines that the UL data could not be transmitted using PUR based on at least one of the above listed conditions, the UE may consider that there is no available PUR or the PUR is not available. If the UE determines that at least the RRC message could be transmitted using PUR based on at least one of the above listed conditions, the UE may consider that there is available PUR or the PUR is available. Whether PUR is available may be on per beam basis. For example, PUR may be available on one beam but may not be available on another beam.

The PUR could be a dedicated PUR (or called D-PUR). From the UE's perspective, a "dedicated PUR" may imply that the UL resource is not shared with another UE and the NW could identify which UE is performing the transmission using this dedicated PUR. The UE may not expect any conflict or collision with other UEs when performing transmission using the dedicated PUR. There may be no Contention Resolution required for the dedicated PUR transmission.

The PUR may be configured to the UE on per beam basis. For example, the UE may be configured with PUR on one beam of a cell but not on another beam of the cell. The network may indicate to the UE which beam(s) where the PUR is configured.

In the RAN2 #107 meeting (as discussed in 3GPP R2-1912001), it was agreed that valid TA is a requirement in order to initiate D-PUR transmission. And the MAC CE for TA update can be sent along with the RRC transmission of the downlink RRC response message for the CP solution and UP solution.

In the RAN4 #92 meeting (as discussed in 3GPP R4-1910701), under the discussion of additional MTC enhancements for LTE, there is possible agreement that eNB can configure any of K=1 and K=2, i.e. one or two thresholds for validating the TA when configured with serving cell measurement change attribute.

According to 3GPP R4-1910176, K=1 means that the UE compares the magnitude of the difference in measurement change with a single threshold to validate the TA for PUR transmission. And K=2 means that UE compares the difference in measurement change with a negative (RSRPneg/NRSRPneg) threshold and also compares the difference in measurement change with a positive (RSRPpos/NRSRPpos) threshold. The UE validates the TA for PUR transmission based on these comparisons.

Timing advance (TA) may be considered as the value corresponding to the length of time a signal takes to reach the base station (e.g. eNB, gNB) from a UE. Since UEs at various distances from the base station and radio waves travel at the finite speed of light, the previse arrival-time within a time slot can be used by the base station to determine the distance to the UE. The time at which the UE is allowed for transmission within a time slot must be adjusted accordingly to prevent collisions with adjacent users. TA is the variable controlling the adjustment (as discussed in the Wikipedia article entitled "Timing advance").

Figure 5:
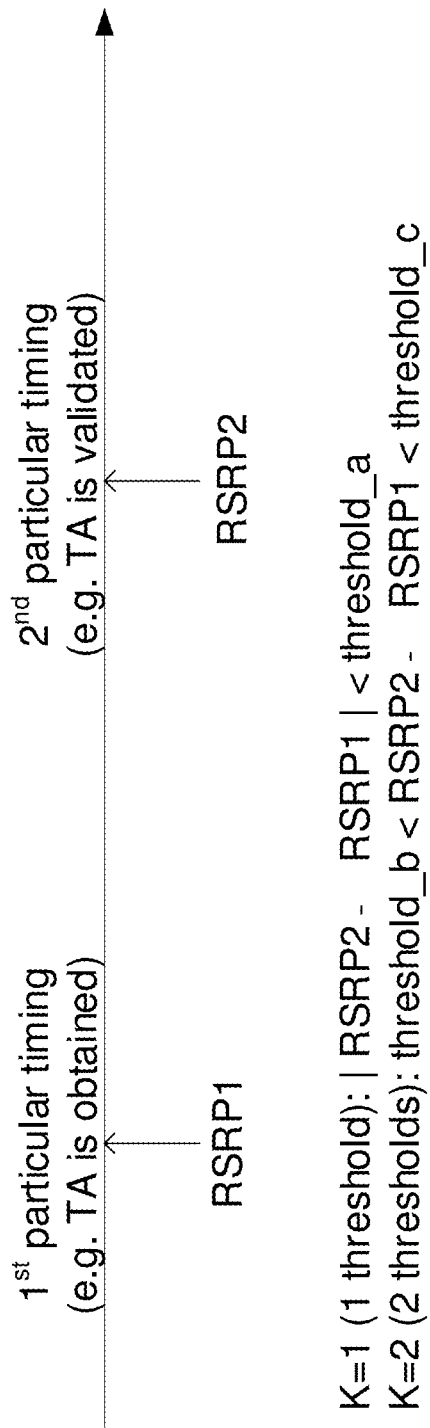
FIG. 5 shows an example of Timing Advance (TA) validation for Preconfigured Uplink Resource (PUR) according to one exemplary embodiment.

TA validation for PUR (or D-PUR) could be based on the magnitude of the difference between the serving cell measurement result at a first particular timing (e.g. when TA is obtained, last TA validation) and the serving cell measurement result at a second particular timing (e.g. when TA is validated). If the measurement result changes too much (compare with one or two thresholds, depending on the configuration), TA could be considered as invalid. The serving cell measurement result could be RSRP. An example is shown in FIG. 5, which illustrates an example of TA validation for PUR. If the difference between RSRP2 and RSRP1 fulfills the equation (for K=1 or K=2, depending on the configuration of K), the validation of TA could be passed (and the maintained TA could be considered as valid). Otherwise (i.e. the difference does not fulfill the equation), the validation of TA could be considered as failed (and the maintained TA is considered as invalid).

In NR, beamforming may be used. Different beams may have different measurement results, and serving cell measurement result is derived from beam measurement results of the serving cell. According to the current 3GPP TS 38.304, cell measurement result is in general derived from the linear average of the power values of up to N highest beam measurement quantity values above a configured threshold (see 3GPP TS 38.304 for more detail). As the UE moves in the cell, the beam(s) suitable for PUR transmission may be changed, and the TA validity may depend on the location of the UE and the beam(s) used for PUR transmission. Validating TA based on current cell measurement result derivation may not be accurate or sufficient enough.

Figure 6:
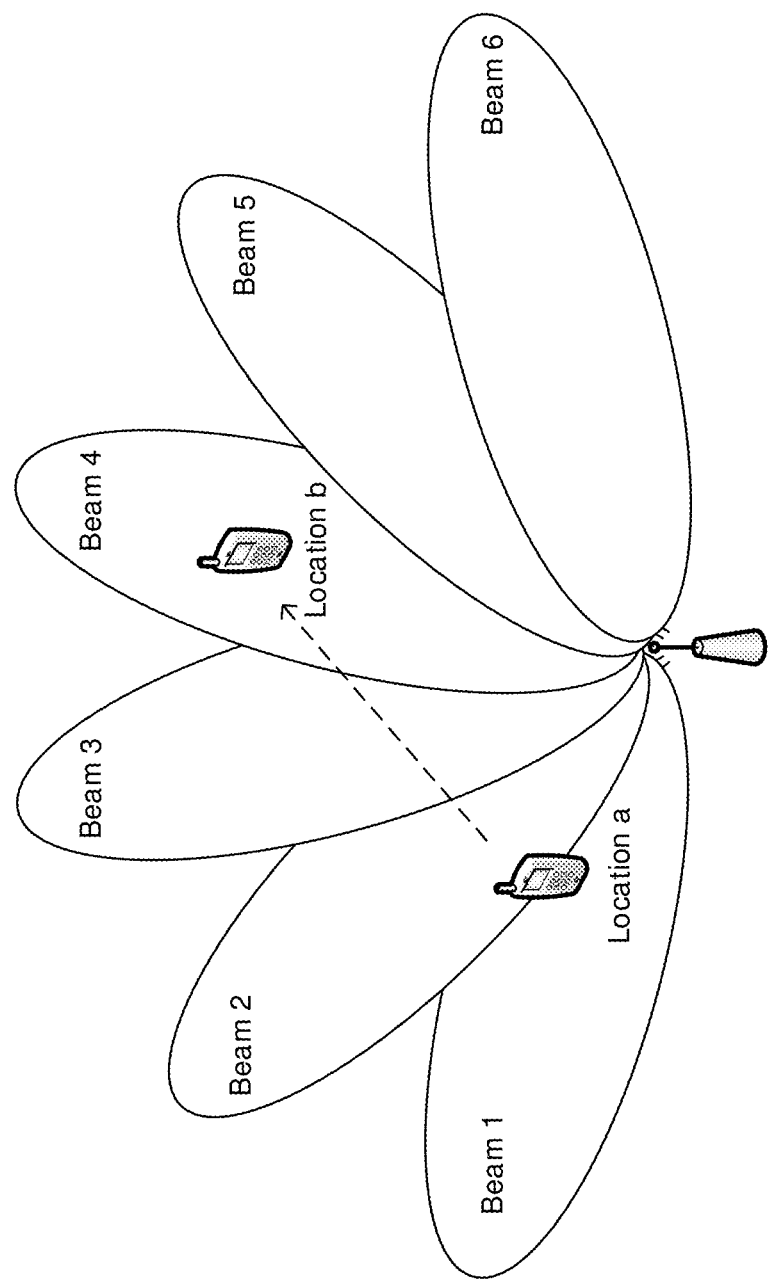
FIG. 6 shows an example of UE movement in a multi-beam cell according to one exemplary embodiment.

An example is shown in FIG. 6, which shows an example of UE movement in a multi-beam cell. In this example, the UE is in location "a" at the first particular timing (e.g. the UE obtains TA or validates TA for a first time when it is in location "a"), and moves to location "b" at the second particular timing (e.g. when validating the TA or validates TA for a second time). At location "a", cell measurement result is derived from beam 1 and beam 2. At location "b", cell measurement result is derived from beam 4. It is assumed that the difference between "cell measurement results derived at location "a" and location "b" is not over the threshold(s).

Figure 7:
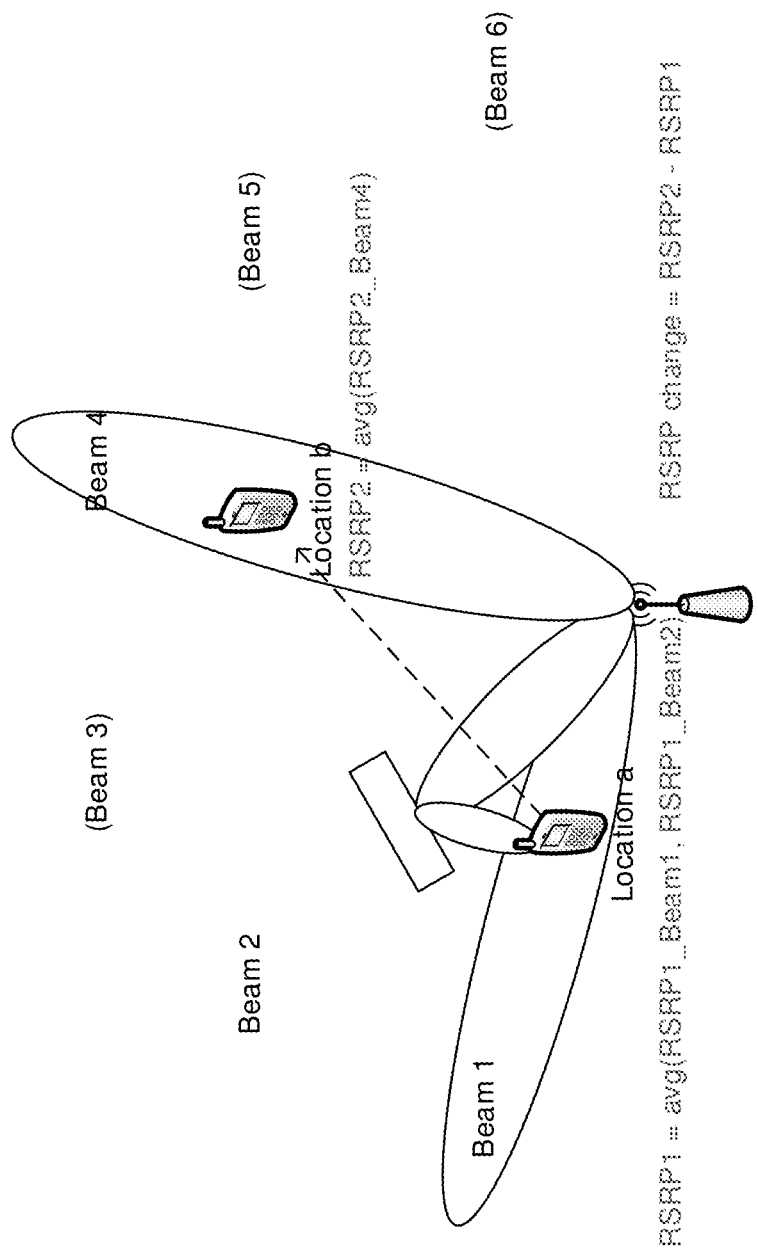
FIG. 7 shows an example of serving Reference Signal Received Power (RSRP) change derivation according to one exemplary embodiment.

Another example is shown in FIG. 7, which shows an example of serving cell RSRP change derivation. In this example, the UE is in location "a" at the first particular timing (e.g. when TA is obtained, when TA is validated for a first time), and moves to location "b" at the second particular timing (e.g. when TA is validated, when TA is validated for a second time). At location "a", cell measurement result is derived from the linear average of the power values (e.g. RSRP) of beam measurement quantity values of beam 1 and beam 2. At location "b" cell measurement result is derived from the power value of beam measurement quantity value of beam 4. It is assumed that the difference between cell measurement results derived at location "a" and location "b" is not over the threshold(s).

In one aspect, it may be possible that based on the current serving cell measurement result derivation, the change in serving cell RSRP is not over the threshold(s) and thus the UE considers the currently maintained TA as valid. However, the TA is actually not suitable (or valid) for some of the beams configured for PUR. Selecting these beams for PUR transmission may result in PUR transmission failure. In the above examples, beam 1 may not be suitable for using the maintained TA for PUR transmission when the UE is in location "b".

In another aspect, it may be possible that based on the current serving cell measurement result derivation, the change in serving cell RSRP is not over the threshold(s) and thus the UE considers the currently maintained TA as valid. However, the TA is actually not valid for PUR transmission. Performing PUR transmission using the TA may result in PUR transmission failure. In the above examples, the TA obtained at location "a" may not compensate the transmission delay accurately at location b", and thus the TA is not valid.

To solve the issue, TA validation (for PUR or D-PUR) in NR could be based on beam measurement result(s) and/or specific measurement result(s) derived from beam measurement result(s) but not follow the method of serving cell measurement quantity derivation (such as serving cell RSRP), for example, for measurement report or cell reselection (the linear average of the power values of up to N highest beam measurement quantity values above a configured threshold, as specified in 3GPP TS 38.304 as discussed quoted above). The serving cell may comprise a plurality of beams. More details are described below.

TA validation (for PUR or D-PUR) could be based on the difference between two measurement results, e.g. the measurement result at a first particular timing (such as when the TA was obtained, last TA validation, and/or at location "a" in the above examples) and the measurement result at a second particular timing (e.g. when the TA is validated and/or at location "b" in the above examples), similar to what is shown in the example of FIG. 5. NW may transmit a signaling including a TA (e.g. an absolute TA value or a relative TA value) to the UE. In response to the reception of the TA, the UE could update its maintained TA based on the obtained TA. After the TA is obtained, the UE may validate the maintained TA from time to time, e.g. every once in a while. If the validation is passed, the maintained TA is considered as valid. If the validation is failed, the maintained TA could be considered as invalid.

The measurement result may at least include beam measurement result(s), cell measurement result(s), and/or one or more specific measurement result(s) derived from one or more beam measurement result(s). The specific measurement result may also include cell measurement result, wherein the cell measurement result may be derived from one or more beam measurement result(s).

The difference of measurement result at the first particular timing and measurement result at the second particular timing, e.g. between the measurement result when the TA was obtained and the measurement result when TA is validated, or between the measurement result when the TA is validated and the measurement result when last TA validation, may be compared with one or multiple (configured) threshold(s). If the comparison is passed (e.g. the difference is not over the threshold), it may mean that the TA is considered as valid, e.g. for the cell(s) or beam(s) associated with the measurement result(s). Alternatively, it may mean that the TA is considered as valid for the corresponding beam(s). For the beam without valid TA, PUR transmission via the beam should be prohibited.

Beam measurement result may be with respect to a specific beam, e.g. measurement result of beam 1 in the above examples, measurement result of the best beam (e.g. the beam with best radio condition). Beam measurement result may be considered as a condition (to select beam or) as the measurement result for TA validation. For example, a beam measurement result of a specific beam is derived from measuring SS/PBCH block (SSB) or Channel State Information-Reference Signal (CSI-RS) on the specific beam or associated with the specific beam.

Beam measurement result of a specific beam may be used for the TA validation (for PUR or D-PUR) on the specific beam. In one example, the measurement results of the same beam at a first particular timing and at a second particular timing are compared, e.g. when TA was obtained and when TA is validated, or when TA is validated and last TA validation. More specifically, the difference between the beam measurement result of the specific beam at the first particular timing, e.g. when the TA was obtained or last TA validation, and the beam measurement result of the same specific beam at the second particular timing, e.g. when the TA is validated, could be used for the TA validation (for PUR or D-PUR) on the specific beam. The difference could be compared with the threshold(s). If the comparison is passed (e.g. the difference is not over the threshold(s)), the TA could be considered as valid on the specific beam, and PUR transmission on the specific beam may not be prohibited due to invalid TA. Then, the UE may perform a PUR transmission on the specific beam. If the comparison is failed (e.g. the difference is over the threshold(s)), the TA could be considered as not valid on the specific beam, and PUR transmission on the specific beam may be prohibited due to invalid TA. TA validation on different beam may be evaluated separately.

Taking FIG. 6 as an example, the beam measurement result of beam 4 at the first particular timing (e.g. when TA is obtained or last TA validation) is RSRP1_beam4 and the beam measurement result of beam 4 at the second particular timing (e.g. when TA is validated) is RSRP2_beam4, if RSRP2_beam4−RSRP1_beam4<threshold, TA for PUR on beam 4 is considered as valid. The beam measurement result of beam 1 at the first particular timing (e.g. when TA is obtained or last TA validation) is RSRP1_beam1 and the beam measurement result of beam 1 at the second particular timing (e.g. when TA is validated) is RSRP2_beam1. If RSRP2_beam1−RSRP1_beam1>threshold, TA for PUR on beam 1 is considered as not valid.

Figure 8:
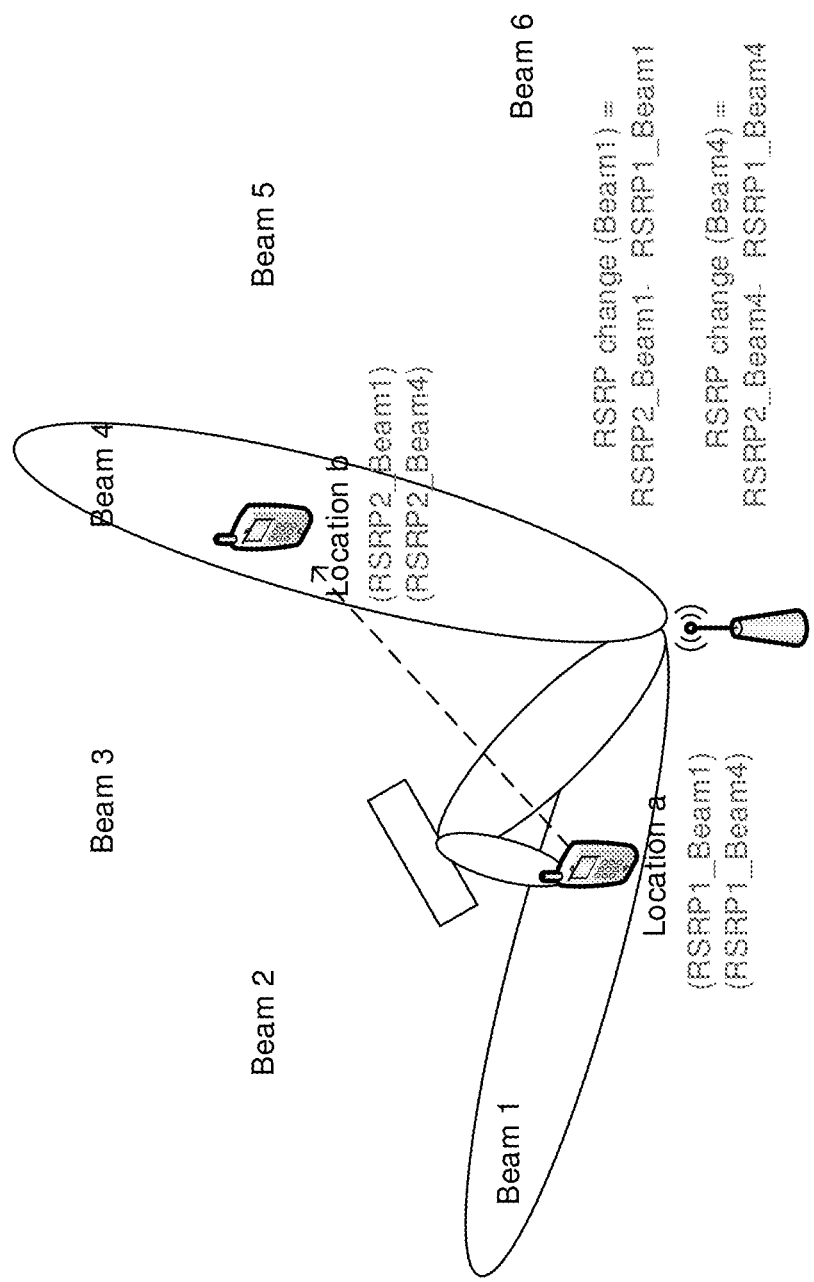
FIG. 8 is diagram according to one exemplary embodiment.

Another example is shown in FIG. 8 (same UE movement as FIG. 7). In this example, the beam measurement result of beam 4 at the first particular timing (e.g. when TA is obtained or last TA validation) is RSRP1_beam4 and the beam measurement result of beam 4 at the second particular timing (e.g. when TA is validated) is RSRP2_beam4. If RSRP2_beam4−RSRP1_beam4<threshold, TA for PUR on beam 4 is considered as valid. The beam measurement result of beam 1 at the first particular timing (e.g. when TA is obtained or last TA validation) is RSRP1_beam1 and the beam measurement result of beam 1 at the second particular timing (e.g. when TA is validated) is RSRP2_beam1. If RSRP2_beam1−RSRP1_beam1>threshold, TA for PUR on beam 1 is considered as not valid.

The specific measurement result (e.g. cell measurement result) may be derived from one or more beam measurement results.

The (set of) beam(s) to be considered to derive the beam measurement result and/or the specific measurement result at the first particular timing, e.g. when TA is obtained or last TA validation (e.g. cell measurement result at the first particular timing, denoted as RSRP1_cell), may include one or multiple of the following conditions:

The beam(s) used for scheduling the signaling including the TA—NW may transmit a downlink control signaling (e.g. DCI) on a downlink control channel (e.g.

PDCCH) to schedule a downlink transmission (e.g. on Physical Downlink Shared Channel (PDSCH)) to the UE. The downlink transmission may be a signaling including the TA. If the NW transmits the downlink control signaling via a specific beam, the UE may use the measurement result of the specific beam (or derived from the specific beam) as the measurement result at the first particular timing, e.g. when TA is obtained or last TA validation, for TA validation.

The beam(s) used for transmitting the signaling including the TA—NW may provide the TA to the UE via a downlink transmission (e.g. on PDSCH). The downlink transmission may be a signaling including the TA. If the NW transmits the signaling including the TA via a specific beam, the UE may use the measurement result of the specific beam (or derived from the specific beam) as the measurement result at the first particular timing, e.g. when TA is obtained or last TA validation, for TA validation.

The beam(s) indicated by network—NW may indicate the beam(s) to be considered (to derive measurement result(s)) for TA validation either explicitly or implicitly. For example, NW may provide an explicit indication (or configuration) indicating the beam(s) (to derive measurement result(s)) to be considered for TA validation. For example, the UE may derive the beam(s) (to derive measurement result(s)) to be considered for TA validation based on some configuration provided by NW. For example, the UE may derive the beam(s) (to derive measurement result(s)) to be considered for TA validation based on some predefined rule(s).

The beam(s) configured with PUR—TA validation for PUR is used to check whether PUR transmission is allowed. PUR configuration may be beam specific. PUR may be configured in some beam(s) of the cell and not in some other beam(s) of the cell. The beam(s) configured with PUR may be considered (to derive measurement result(s)) for TA validation. The beam(s) not configured with PUR may not be considered (to derive measurement result(s)) for TA validation.

The beam(s) with the best radio condition—The best beam (or the beam with the best radio condition) may be the beam with highest measurement quality (among the beams of the cell). The beam(s) with the best radio condition may be limited to a specific number, e.g. up to N beams. The specific number may be predefined or configured by network. The specific number may be 1. The specific number may be the same or separate from the parameters used for cell reselection (e.g. the number for cell reselection could be different from the number for TA validation).

The beam(s) not configured with PUR may not be considered, e.g. the beam(s) with the best radio condition among beam(s) configured with PUR is considered.

The beam(s) with radio condition above a (second) threshold—The threshold may be used for filtering qualified beams and may be separate from the threshold used to compare with the difference of the measurement results for TA validation. The threshold may be configured by network. The threshold may be the same or separate from the parameters used for cell reselection (e.g. the threshold for cell reselection could be different from the threshold for TA validation). The beam(s) with radio condition above a threshold may be limited to a specific number, e.g. up to N beams. The specific number may be predefined or configured by network. The specific number may be 1. The specific number may be separate from the parameters used for cell reselection (e.g. the number for cell reselection could be different from the number for TA validation).

Every beam of the cell—A cell may comprise multiple beams to cover all directions of the cell. The measurement result of all beams of the cell may be considered for TA validation. The beam may be detected (or detectable) by the UE. The beam may be common for all UEs in the cell.

Average of up to N beams above a threshold—The measurement result may be derived from the linear average of the power values of up to N highest beam measurement quantity values above a configured threshold.

Alternatively or additionally, the beam(s) to be considered to derive the specific measurement result may be the combination of the above items, e.g. the beam(s) with best radio condition up to N beams and above a (second) threshold, the beam(s) with best radio condition and configured with PUR, the beam(s) indicated by network and with radio condition above a (second) threshold, and so on. The combination may mean that the beam(s) to be considered fulfills a combination of the above conditions, e.g. the beam(s) fulfilling condition A+B. The combination may mean that the beam(s) to be considered include the beam fulfills one condition and the beam fulfills another condition, e.g. the beam(s) fulfilling condition A+the beam(s) fulfilling condition B.

Other than the beam(s) to be considered, the rest of the beams of the cell may not be taken into account.

The (set of) beam(s) to be considered to derive the beam measurement result and/or the specific measurement result at the second particular timing, e.g. when TA is validated (e.g. cell measurement result at the second particular timing, denoted as RSRP2_cell), may include one or multiple of the following conditions:

Same (set of) beam(s) which are considered at the first particular timing (e.g. when TA is obtained or last TA validation)—At the first particular timing, a (set of) beam(s) is considered for TA validation (e.g. based on the above alternatives). At the second particular timing, the same (set of) beam(s) is considered for TA validation. Taking FIG. 6 as an example, the measurement result at the first particular timing (e.g. RSRP1), e.g. when TA is obtained or last TA validation (at location "a"), is derived from beam measurement results of beam 1 and beam 2. At the second particular timing, e.g. when the UE is in location "b" to validate TA, the measurement result (e.g. RSRP2) is derived from beam measurement results of beam 1 and beam 2 (at location "b")

The beam(s) selected to be used for (potential) PUR transmission—TA validation is used for PUR transmission. At the second particular timing, e.g. when TA is validated, the UE determines the beam(s) to be used for PUR transmission, assuming that PUR transmission is allowed. For example, the determination may be based on configuration of PUR and/or the radio condition of beams. The UE uses the determined beam(s) to derive the measurement result for TA validation. If the TA validation is passed, the UE is allowed to perform PUR transmission via the determined beam(s). Then the UE may select a beam among the determined beam(s) for actual PUR transmission.

The beam(s) indicated by network—NW may indicate the beam(s) to be considered (to derive measurement result(s)) for TA validation either explicitly or implicitly. For example, NW may provide an explicit indication (or configuration) indicating the beam(s) (to derive measurement result(s)) to be considered for TA validation. For example, the UE may derive the beam(s) (to derive measurement result(s)) to be considered for TA validation based on some configuration provided by NW. For example, the UE may derive the beam(s) (to derive measurement result(s)) to be considered for TA validation based on some predefined rule(s).

The beam(s) configured with PUR—TA validation for PUR is used to check whether PUR transmission is allowed. PUR configuration may be beam specific. PUR may be configured in some beam(s) of the cell and not in some other beam(s) of the cell. The beam(s) configured with PUR may be considered (to derive measurement result(s)) for TA validation. The beam(s) not configured with PUR may not be considered (to derive measurement result(s)) for TA validation.

The beam(s) with best radio condition—The best beam (or the beam with the best radio condition) may be the beam with highest measurement quality (among the beams of the cell). The beam(s) with the best radio condition may be limited to a specific number, e.g. up to N beams. The specific number may be predefined or configured by network. The specific number may be 1. The specific number may be separate from the parameters used for cell reselection (e.g. the number for cell reselection could be different from the number for TA validation). The beam(s) not configured with PUR may not be considered, e.g. the beam(s) with the best radio condition among beam(s) configured with PUR is considered.

The beam(s) with radio condition above a (second) threshold—The threshold may be used for filtering qualified beams and may be separate from the threshold used to compare with the difference of the measurement results for TA validation. The threshold may be configured by network. The threshold may be the same or separate from the parameters used for cell reselection (e.g. the threshold for cell reselection could be different from the threshold for TA validation). The beam(s) with radio condition above a threshold may be limited to a specific number, e.g. up to N beams. The specific number may be predefined or configured by network. The specific number may be 1. The specific number may be separate from the parameters used for cell reselection (e.g. the number for cell reselection could be different from the number for TA validation).

Every beam of the cell—A cell may comprise multiple beams to cover all directions of the cell. The measurement result of all beams of the cell may be considered for TA validation. The beam may be detected (or detectable) by the UE. The beam may be common for all UEs in the cell.

Average of up to N beams above a threshold—The measurement result may be derived from the linear average of the power values of up to N highest beam measurement quantity values above a configured threshold.

Alternatively or additionally, the beam(s) to be considered to derive the specific measurement result may be the combination of the above items, e.g. the beam(s) with best radio condition up to N beams and above a (second) threshold, the beam(s) with best radio condition and configured with PUR, the beam(s) indicated by network and with radio condition above a (second) threshold, and so on. The combination may mean that the beam(s) to be considered fulfills a combination of the above conditions, e.g. the beam(s) fulfilling condition A+B. The combination may mean that the beam(s) to be considered include the beam fulfills one condition and the beam fulfills another condition, e.g. the beam(s) fulfilling condition A+the beam(s) fulfilling condition B.

Other than the beam(s) to be considered, the rest of the beams of the cell may not be taken into account.

The (set of) beam(s) to be considered to derive the beam measurement result and/or the specific measurement result at the first particular timing (e.g. when TA is obtained or last TA validation, RSRP1_cell) and at the second particular timing (e.g. when TA is validated, RSRP2_cell) may be different (set of) beams. For example, the beam used for scheduling (or transmitting) the signaling including the TA is considered at the first particular timing (e.g. when TA is obtained or last TA validation). At the second particular timing (e.g. when TA is validated), beam measurement result of a specific beam is compared to the specific measurement result derived from beam used for scheduling (or transmitting) the signaling including the TA (or the beam measurement result of the beam used for scheduling (or transmitting) the signaling including the TA). If the comparison is passed (e.g. the difference is not over the threshold), the TA is considered as valid on the specific beam. PUR transmission on the specific beam is not prohibited. If the comparison is failed (e.g. the difference is over the threshold), the TA is considered as not valid on the specific beam. PUR transmission on the specific beam is prohibited. TA validation on different beam is evaluated separately.

Figure 9:
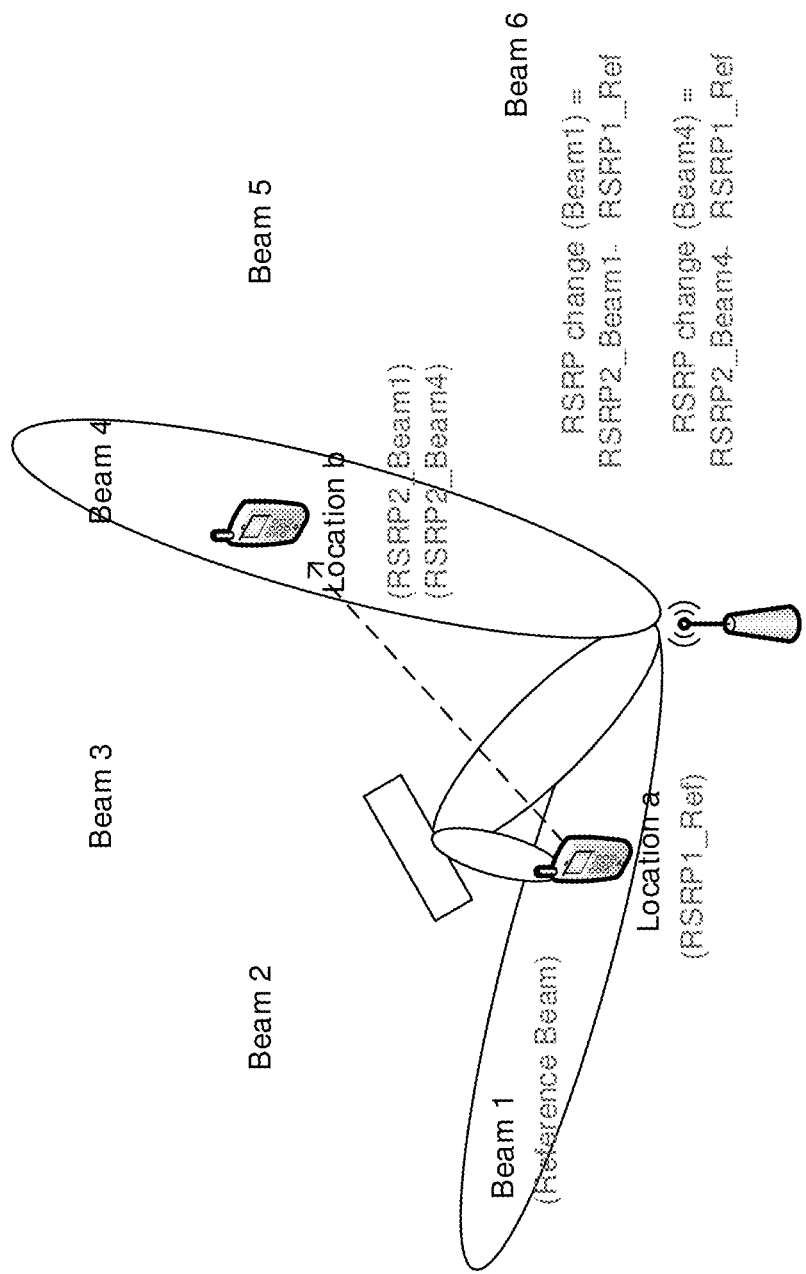
FIG. 9 is a diagram according to one exemplary embodiment.

An example is shown in FIG. 9 (same UE movement as FIG. 7). In this example, the beam to be considered at the first particular timing (e.g. when TA is obtained or last TA validation) is beam 1, e.g. the best beam, the beam schedules the TA, the beam receives the TA, etc. The beam measurement result of beam 1 at the first particular timing (e.g. when TA is obtained or last TA validation) is RSRP1_beam1 and the beam measurement result of beam 4 at the second particular timing (e.g. when TA is validated) is RSRP2_beam4. If RSRP2_beam4−RSRP1_beam1<threshold, TA for PUR on beam 4 is considered as valid. The beam measurement result of beam 1 at the first particular timing (e.g. when TA is obtained or last TA validation) is RSRP1_beam1 and the beam measurement result of beam 1 at the second particular timing (e.g. when TA is validated) is RSRP2_beam1. If RSRP2_beam1−RSRP1_beam1>threshold, TA for PUR on beam 1 is considered as not valid.

The (set of) beam(s) to be considered to derive the beam measurement result and/or the specific measurement result at the first particular timing (e.g. when TA is obtained or last TA validation, RSRP1_cell) and at the second particular timing (e.g. when TA is validated, RSRP2_cell) may be the same (set of) beams. For example, the beam used for transmitting the signaling including the TA is considered to derive the measurement result at the first particular timing (e.g. when TA is obtained). At the second particular timing (e.g. when TA is validated), the measurement result of the same beam is used to compare with the previous measurement result. If the comparison is passed, the TA of the cell is considered as valid. PUR transmission of the cell is not prohibited. If the comparison is failed, the TA of the cell is considered as invalid. PUR transmission of the cell is prohibited.

The (set of) beam(s) to be considered to derive the beam measurement result and/or the specific measurement result at the first particular timing (e.g. when TA is obtained or last TA validation, RSRP1_cell) and at the second particular timing (e.g. when TA is validated, RSRP2_cell) may be the (set of) beam(s) which fulfills the same condition(s). The actual selected beam(s) may be the same. The actual selected beam(s) may be different. For example, the beam with the best radio condition is considered to derive the measurement result at the first particular timing (e.g. when TA is obtained or last TA validation) and the measurement result at the second particular timing (e.g. when TA is validated), although the beam with the best condition are different at the first particular timing (e.g. when TA was obtained or last TA validation) and at the second particular timing (e.g. when TA is validated).

The (set of) beam(s) to be considered to derive the beam measurement result and/or the specific measurement result at the first particular timing (e.g. when TA is obtained or last TA validation, RSRP1_cell) and at the second particular timing (e.g. when TA is validated, RSRP2_cell) may be the (set of) beam(s) which fulfills different condition(s). The actual selected beam(s) may be the same. The actual selected beam(s) may be different.

Other than the (set of) beam(s) to be considered to derive the beam measurement result and/or the specific measurement result, the rest of beam(s) may be not considered in the derivation of the beam measurement result and/or the specific measurement result.

The UE may obtain the TA by receiving a signaling including a TA command, e.g. the UE obtains the TA by adjusting the maintained TA based on the TA command. The signaling may be a TA command MAC CE. The signaling may be a random access response. The TA may be the latest received TA (or the last obtained TA). The TA may be the latest received TA (or the last obtained TA) before RRC state transition (e.g. from connected state to idle state, from connected state to inactive state). The TA may be the latest received TA (or the last obtained TA) in the current RRC state (e.g. connected state, idle state, inactive state). The TA may not be considered as invalid during (or upon) state transition (e.g. from connected state to idle state, from connected state to inactive state).

The measurement result at the first or the second particular timing (e.g. when TA is obtained or last TA validation, when TA is validated) may be obtained and/or measured by the UE around the first or the second particular timing (e.g. the time when the UE obtains the TA, the last time the UE validates the TA, the time when the UE validates the TA), e.g. within a small time period. The measurement result at the first or the second particular timing (e.g. when TA is obtained or last TA validation, when TA is validated) may be the last measurement result obtained and/or measured by the UE before the first or the second particular timing (e.g. when the UE obtains the TA or last TA validation, when the UE validates the TA).

The measurement result may at least include RSRP, RSRQ, RSSI, SINR, or the combination of the above. Since different beam may have different interference, and it may result in insufficient Tx power to use PUR successfully, measurement other than RSRP may be considered. Taking FIG. 5 as an example, RSRP 2 could be replaced by RSRQ 2, RSSI 2, or SINR 2. Similarly, RSRP 1 could be replaced by RSRQ 1, RSSI 1, SINR 1. And the difference of the measurement result to be compared with the threshold(s) could be RSRP2−RSRP1, RSRQ2−RSRQ1, RSSI2−RSSI1, or SINR2−SINR1. Combination of them could also be considered.

The UE performs measurement on the serving cell and/or beams of the serving cell. The UE obtains a measurement result (e.g. beam measurement result) based on the measurement. The UE obtains the measurement result by lower layer. The measurement result may be further processed by higher layer. For example, the measurement result may be filtered by higher layers. For example, the measurement result may be the average of the previous measurement results (e.g. liner average, weighted average).

The measurement result derived from one or multiple beam measurement results may be the average (e.g. linear average, weighted average) of the beam measurement results of each beam to be considered.

The beam measurement result may be the result of measuring a specific beam of the cell. The cell measurement result may be the result of measuring a specific cell, e.g. the serving cell. The cell measurement result may be derived from the beam measurement result of one or multiple beams of the cell.

The PUR may be dedicated and/or shared. The dedicated PUR may be D-PUR. The PUR may be provided by a dedicated signaling. The PUR may be provided by system information.

The beam may be a NW beam. The beam may be associated to a SSB. The beam may be associated to a CSI-RS. The beam may be common in the cell. The beam may be UE specific.

The UE may be in the same serving cell at the first particular timing (e.g. when TA is obtained or last TA validation) and at the second particular timing (e.g. when TA is validated).

In one example, to validate TA with respect to a specific beam based on the measurement result, the difference between the beam measurement result of the specific beam at the first particular timing (e.g. when TA was obtained or last TA validation) and the beam measurement result of the specific beam at the second particular timing (e.g. when TA is validated) is compared with one or multiple (configured) threshold(s). If the comparison is passed (e.g. the difference is not over the threshold(s)), the TA with respect to the specific beam is considered as valid. PUR transmission via the beam with valid TA may be allowed. If the comparison is failed (e.g. the difference is over the threshold(s)), the TA with respect to the specific beam is considered as invalid. PUR transmission via the beam with invalid TA may be prohibited (due to invalid TA).

In another example, to validate TA with respect to the (serving) cell based on measurement result(s), beam measurement result(s) and/or the specific measurement result (e.g. cell measurement result) may be taken into account. For example, the comparison of the measurement results may include: {(a): RSRP 2_beam 1−RSRP 1_beam 1, (b): RSRP 2_beam 2−RSRP 1 beam 1, (c): RSRP 2_beam 3−RSRP 1_beam3, (d): RSRP 2_cell−RSRP 1_cell}. The validated TA may be considered as not valid in the following alternatives:

Option 1: Comparison of any Beam is Failed
For example, if either (a), (b), or (c) is failed (e.g. over the threshold(s)), TA of the cell is considered as invalid. Otherwise, TA of the cell is considered as valid.

Option 2: Comparison of N Beams are Failed
For example, if N=2, and any 2 results among (a)(b)(c) are failed (e.g. over the threshold(s)) (e.g. (b) and (c)), TA of the cell is considered as invalid. Otherwise, TA of the cell is considered as valid.

Option 3: Comparison of all Beams are Failed
For example, if (a)(b)(c) are all failed (e.g. over the threshold(s)), TA of the cell is considered as invalid. Otherwise, TA of the cell is considered as valid.

Option 4: Comparison of the Specific Measurement Result (e.g. Cell Measurement Result) is Failed For example, if (d) is failed (e.g. over the threshold(s)), TA of the cell is considered as invalid. Otherwise, TA of the cell is considered as valid.

Option 5: Comparison of Both the Specific Measurement Result (e.g. Cell Measurement Result) and Beam Measurement Result are Failed The comparison of the specific measurement result may be like option 4, and the comparison of beam measurement result may be any of option 1/2/3. For example, considering option 3+4, if (a)(b)(c) and (d) are all failed (e.g. over the threshold(s)), TA of the cell is considered as invalid. Otherwise, TA of the cell is considered as valid.

The threshold(s) for beam measurement result comparison may be separate from the threshold(s) for the specific measurement result comparison. For example, TA validation considers the difference of the cell measurement result at the first particular timing and at the second particular timing as well as the difference of the beam measurement result at the first particular timing and at the second particular timing. To validate the TA, the difference of the cell measurement result is compared to a first threshold (e.g. threshold_cell), and the difference of the beam measurement result is compared to a second threshold (e.g. threshold_beam). Considering option 5, if both the comparisons of cell and beam are passed, TA is considered as valid.

For example, a UE could receive a first signaling (e.g. RRCRelease message) to configure a preconfigured uplink resource (PUR) to be used in a cell (e.g. when the UE is RRC_CONNECTED). Before the UE use the PUR in the cell (e.g. when the UE is in RRC_INACTIVE), the UE needs to determine whether a timing advance (e.g. to adjust a transmission timing of an UL transmission using the PUR) is valid or not. If the timing advance is not valid, the UE cannot use the PUR. Otherwise, the UE may be allowed to use the PUR (e.g. also based on other criteria).

Whether the timing advance is valid or not could be at least based on a difference between a first measurement result and a second measurement result. The difference could be compared with one or more thresholds to determine whether the timing advance is valid or not.

The first measurement result and the second measurement result could be RSRP. The first measurement result could be derived before deriving the second measurement result. Alternatively, the first measurement result could be derived after deriving the second measurement result.

The first measurement result may not be a cell measurement quantity of the cell. The first measurement result could be derived from beam(s) of the cell which is allowed to use the PUR. The first measurement result may not be derived from beam(s) of the cell which is not allowed to use the PUR. The first measurement result could be derived from a first number of beams of the cell. The first number could be more than one. Alternatively, the first number could be one.

The first measurement result could be a beam measurement quantity. The first measurement result could be derived from a (single) beam, of the cell, where to receive a second signaling (e.g. timing advance command) to adjust the timing advance. Alternatively, the first measurement result could be derived from a (single) beam, of the cell, where to receive a third signaling (e.g. PDCCH) to schedule the second signaling. Alternatively, the first measurement result could be derived from a (single) beam, of the cell, with best radio condition, e.g. when the UE receives the second signaling, when the UE receives the third signaling, when the UE determines whether to use the PUR, or when the UE determines whether the timing advance is valid. Alternatively, the first measurement result could be derived from a (single) beam, of the cell, with a radio condition (e.g. with respect to RSRP) above (or equal to) a threshold, e.g. when the UE receives the second signaling, when the UE receives the third signaling, when the UE determines whether to use the PUR, or when the UE determines whether the timing advance is valid.

The first measurement result could be derived when the UE obtains the timing advance (e.g. when the UE receives the second signaling or the third signaling). Alternatively, the first measurement result could be derived when the UE receives an RRCRelease message (e.g. the first signaling) or performs a procedure for transiting (RRC) state from RRC_CONNECTED to RRC_INACTIVE. Alternatively, the first measurement result could be derived when the UE determines whether to use the PUR. Alternatively, the first measurement result could be derived when the UE determines whether the timing advance is valid.

The second measurement result could be a cell measurement quantity of the cell. Alternatively, the second measurement result may not be a cell measurement quantity of the cell. The second measurement result could be derived from beam(s) of the cell which is allowed to use the PUR. The second measurement result may not be derived from beam(s) of the cell which is not allowed to use the PUR. The second measurement result could be derived from a second number of beams of the cell. The second number could be more than one. Alternatively, the second number could be one.

The second measurement result could be a beam measurement quantity. The second measurement result could be derived from a (single) beam, of the cell, where to receive a second signaling (e.g. timing advance command) to adjust the timing advance. Alternatively, the second measurement result could be derived from a (single) beam, of the cell, where to receive a third signaling (e.g. PDCCH) to schedule the second signaling. Alternatively, the second measurement result could be derived from a (single) beam, of the cell, with best radio condition, e.g. when the UE receives the second signaling, when the UE receives the third signaling, when the UE determines whether to use the PUR, or when the UE determines whether the timing advance is valid. Alternatively, the second measurement result could be derived from a (single) beam, of the cell, with a radio condition (e.g. with respect to RSRP) above (or equal to) a threshold, e.g. when the UE receives the second signaling, when the UE receives the third signaling, when the UE determines whether to use the PUR, or when the UE determines whether the timing advance is valid.

The second measurement result could be derived when the UE obtains the timing advance (e.g. when the UE receives the second signaling or the third signaling). Alternatively, the second measurement result could be derived when the UE receives an RRCRelease message (e.g. the first signaling) or performs a procedure for transiting (RRC) state from RRC_CONNECTED to RRC_INACTIVE. Alternatively, the second measurement result could be derived when the UE determines whether to use the PUR. Alternatively, the second measurement result could be derived when the UE determines whether the timing advance is valid.

The first measurement result and the second measurement result could be derived from different beams of the cell. The first number and the second number could be different. Alternatively, the first measurement result and the second measurement result could be derived from the same beam(s) of the cell. The first number and the second number could be the same.

The cell measurement quantity could be derived based on a linear average of the power values of up to a number of highest beam measurement quantity values above a second threshold. The cell measurement quantity could be used by the UE to determine whether to select another cell to camp on (e.g. for cell reselection). The cell measurement quantity could represent radio quality of a cell. The cell measurement quantity could be included in a measurement report as a cell quality.

The beam measurement quantity could be derived based on a power value of one beam. The beam measurement quantity and the cell measurement quantity could be derived based on different formula. The beam measurement quantity and the cell measurement quantity could be derived from power values of different numbers of beams.

The cell could comprise a plurality of beams. A beam of the cell could be represented by a signal (e.g. SSB or CSI-RS) transmitted by a base station controlling the cell.

In the method mentioned above, TA validation for PUR in NR multi-beam cell could be performed more accurately.

Figure 10:
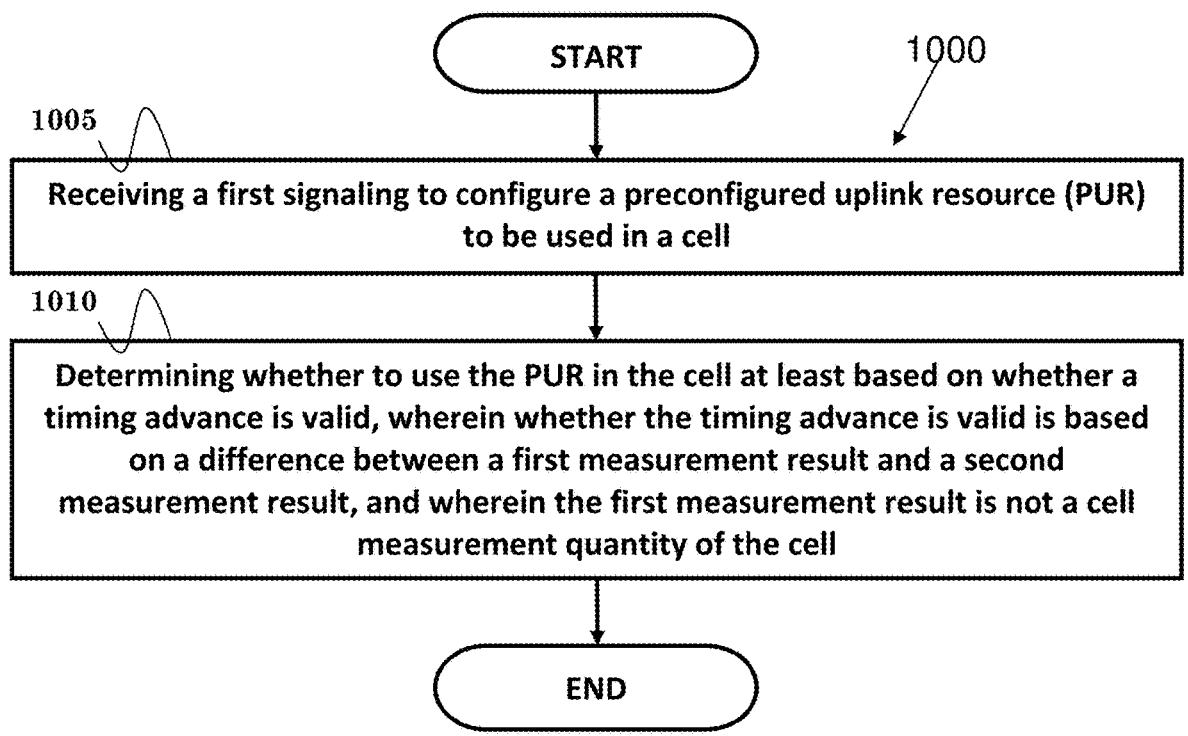
FIG. 10 is a flow chart according to one exemplary embodiment.

FIG. 10 is a flow chart 1000 according to one exemplary embodiment from the perspective of a UE. In step 1005, the UE receives a first signaling to configure a preconfigured uplink resource (PUR) to be used in a cell. In step 1010, the UE determines whether to use the PUR in the cell at least based on whether a timing advance is valid, wherein whether the timing advance is valid is based on a difference between a first measurement result and a second measurement result, and wherein the first measurement result is not a cell measurement quantity of the cell.

In one embodiment, the first measurement result could be derived at a first timing and the second measurement result is derived at a second timing. The first timing or the second timing could be when the UE obtains the timing advance. Alternatively, the first timing or the second timing could be when the UE receives a RRCRelease message or performs a procedure for transiting state from RRC_CONNECTED to RRC_INACTIVE. The first timing or the second timing could be when the UE determines whether to use the PUR.

In one embodiment, the first measurement result could be a first beam measurement quantity. The second measurement result could be a second beam measurement quantity or the cell measurement quantity. The first measurement result or the second measurement result could be derived from a single beam, of the cell, where to receive a second signaling to adjust the timing advance or a third signaling to schedule the second signaling.

In one embodiment, the first measurement result or the second measurement result could be derived from a single beam, of the cell, with best radio condition when the UE receives a second signaling to adjust the timing advance or a third signaling to schedule the second signaling. The first measurement result and the second measurement result could be different beam measurement quantities derived from different beams of the cell.

Referring back to FIGS. 3 and 4, in one exemplary embodiment of a UE. The UE 300 includes a program code 312 stored in the memory 310. The CPU 308 could execute program code 312 to enable the UE (i) to receive a first signaling to configure a preconfigured uplink resource (PUR) to be used in a cell, and (ii) to determine whether to use the PUR in the cell at least based on whether a timing advance is valid, wherein whether the timing advance is valid is based on a difference between a first measurement result and a second measurement result, and wherein the first measurement result is not a cell measurement quantity of the cell. Furthermore, the CPU 308 can execute the program code 312 to perform all of the above-described actions and steps or others described herein.

Figure 11:
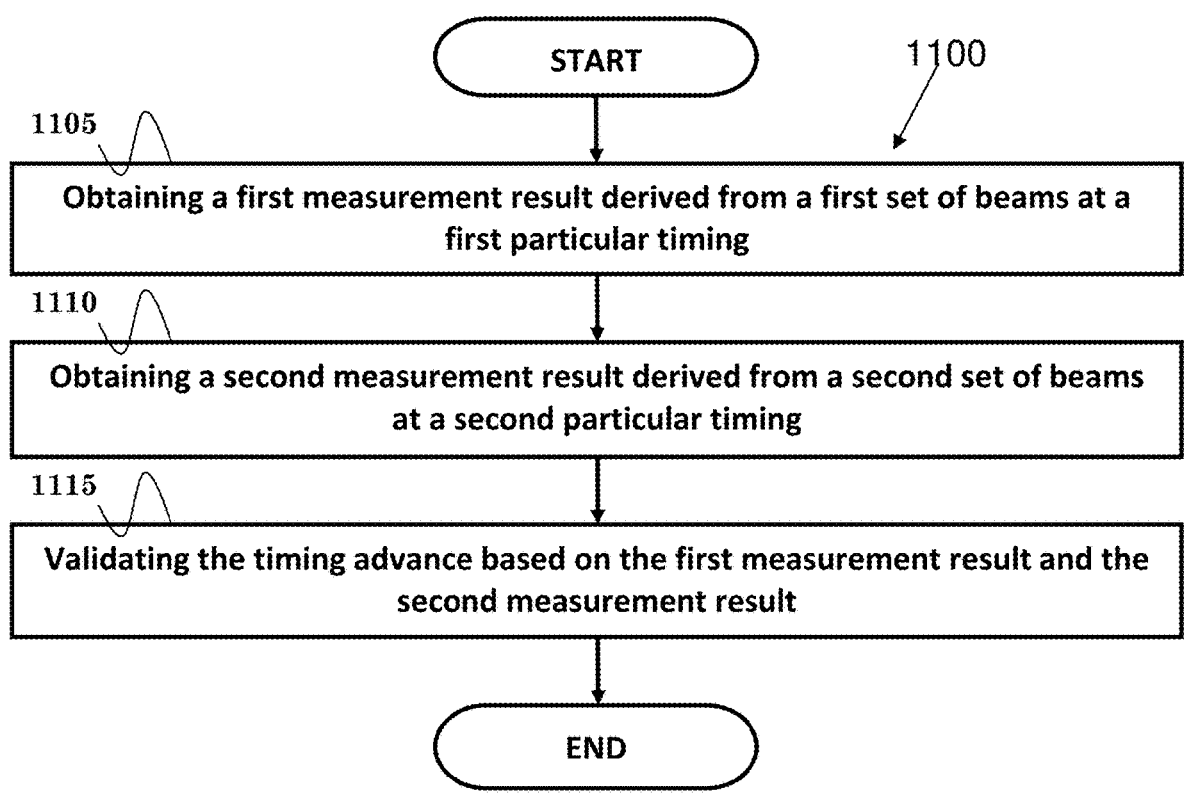
FIG. 11 is a flow chart according to one exemplary embodiment.

FIG. 11 is a flow chart 1100 according to one exemplary embodiment from the perspective of a UE. In step 1105, the UE obtains a first measurement result derived from a first set of beams at a first particular timing. In step 1110, the UE obtains a second measurement result derived from a second set of beams at a second particular timing. In step 1115, the UE validates the timing advance based on the first measurement result and the second measurement result.

In one embodiment, the first or the second measurement result could be beam measurement result. Alternatively, the first or the second measurement result could be cell measurement result.

In one embodiment, the first or the second set of beams could be the beam used for scheduling the downlink transmission including the timing advance, e.g. the beam where PDCCH is transmitted. Alternatively, the first or the second set of beams could be the beam used for transmitting the downlink transmission including the timing advance, e.g. the beam where PDSCH is transmitted. The first or the second set of beams could be indicated by network explicitly or implicitly. The first or the second set of beams could be configured with PUR.

In one embodiment, the first or the second set of beams could be with highest measurement quality, and/or with measurement quality above a second threshold. The first or the second set of beams could be limited to a specific number, e.g. up to N beams. The first or the second set of beams could be every beam of the cell. The first or the second set of beams could be used for (potential) PUR transmission.

In one embodiment, the first set of beams and the second set of beams could be the same. Alternatively, the first set of beams and the second set of beams could be different.

In one embodiment, the UE could validate the timing advance with respect to a specific beam, or with respect to a serving cell. The UE could also validate the timing advance by comparing the difference of the first measurement result and the second measurement result to a first threshold.

In one embodiment, the validation could be passed (and/or the timing advance is considered as valid) if the difference is not over the first threshold. On the other hand, the validation could be failed (and/or the timing advance is considered as invalid) if the difference is over the first threshold.

In one embodiment, the first particular timing could be when the UE obtains a timing advance. The second particular timing could be when the UE validates the timing advance. The beam measurement result could be the result of measuring a specific beam of the cell. The cell measurement result could be derived from one or multiple beam measurement results.

Referring back to FIGS. 3 and 4, in one exemplary embodiment of a UE. The UE 300 includes a program code 312 stored in the memory 310. The CPU 308 could execute program code 312 to enable the UE (i) to obtain a first measurement result derived from a first set of beams at a first particular timing, (ii) to obtain a second measurement result derived from a second set of beams at a second particular timing, and (iii) to validate the timing advance based on the first measurement result and the second measurement result.

Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a User Equipment (UE), comprising:
   receiving a first signaling to configure a preconfigured uplink resource (PUR) to be used in a cell; and
   determining whether to use the PUR in the cell at least based on whether a timing advance is valid, wherein whether the timing advance is valid is based on at least a difference between a first measurement result and a second measurement result derived by the UE, and wherein the second measurement result is derived from one or more beams of the cell with highest measurement quality among a plurality of beams of the cell.

2. The method of claim 1, wherein the first measurement result is derived at a first timing and the second measurement result is derived at a second timing.

3. The method of claim 2, wherein the first timing or the second timing is when the UE obtains the timing advance.

4. The method of claim 2, wherein the first timing or the second timing is when the UE receives a RRCRelease message or performs a procedure for transiting state from RRC_CONNECTED to RRC_INACTIVE.

5. The method of claim 2, wherein the first timing or the second timing is when the UE determines whether to use the PUR.

6. The method of claim 1, wherein the first measurement result is derived from at most the number of beams of the cell with highest measurement quality.

7. The method of claim 1, wherein measurement quality of each beam used to derive the second measurement result is above a threshold.

8. The method of claim 1, wherein the first measurement result is derived from a single beam, of the cell, where to receive a second signaling to adjust the timing advance or a third signaling to schedule the second signaling.

9. The method of claim 1, wherein the first measurement result or the second measurement result is derived from a single beam, of the cell, with highest measurement quality when the UE receives a second signaling to adjust the timing advance or a third signaling to schedule the second signaling.

10. The method of claim 1, wherein the first measurement result and the second measurement result are derived from different beams of the cell.

11. A User Equipment (UE), comprising:
a processor; and
a memory operatively coupled to the processor,
wherein the processor is configured to execute a program code to:
receive a first signaling to configure a preconfigured uplink resource (PUR) to be used in a cell; and
determine whether to use the PUR in the cell at least based on whether a timing advance is valid, wherein whether the timing advance is valid is based on at least a difference between a first measurement result and a second measurement result derived by the UE, and wherein the second measurement result is derived from one or more beams of the cell with highest measurement quality among a plurality of beams of the cell.

12. The UE of claim 11, wherein the first measurement result is derived at a first timing and the second measurement result is derived at a second timing.

13. The UE of claim 12, wherein the first timing or the second timing is when the UE obtains the timing advance.

14. The UE of claim 12, wherein the first timing or the second timing is when the UE receives a RRCRelease message or performs a procedure for transiting state from RRC_CONNECTED to RRC_INACTIVE.

15. The UE of claim 12, wherein the first timing or the second timing is when the UE determines whether to use the PUR.

16. The UE of claim 11, wherein the first measurement result is derived from at most the number of beams of the cell with highest measurement quality.

17. The UE of claim 11, wherein measurement quality of each beam used to derive the second measurement result is above a threshold.

18. The UE of claim 11, wherein the first measurement result is derived from a single beam, of the cell, where to receive a second signaling to adjust the timing advance or a third signaling to schedule the second signaling.

19. The UE of claim 11, wherein the first measurement result or the second measurement result is derived from a single beam, of the cell, with highest measurement quality when the UE receives a second signaling to adjust the timing advance or a third signaling to schedule the second signaling.

20. The UE of claim 11, wherein the first measurement result and the second measurement result are derived from different beams of the cell.

* * * * *